(12) United States Patent
Urano

(10) Patent No.: US 10,198,944 B2
(45) Date of Patent: Feb. 5, 2019

(54) AUTOMATIC DRIVING DEVICE

(71) Applicant: TOYOTA JIDOSHA KABUSHIKI KAISHA, Aichi-ken (JP)

(72) Inventor: Hiromitsu Urano, Numazu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/848,675

(22) Filed: Dec. 20, 2017

(65) Prior Publication Data

US 2018/0137751 A1   May 17, 2018

Related U.S. Application Data

(62) Division of application No. 14/992,124, filed on Jan. 11, 2016, now Pat. No. 9,886,852.

(30) Foreign Application Priority Data

Jan. 19, 2015 (JP) .................................. 2015-007761

(51) Int. Cl.
*G08G 1/015* (2006.01)
*G01C 21/34* (2006.01)
(Continued)

(52) U.S. Cl.
CPC .......... *G08G 1/015* (2013.01); *G01C 21/3453* (2013.01); *G01C 21/3461* (2013.01);
(Continued)

(58) Field of Classification Search
CPC ............ G01C 21/3453; G01C 21/3461; G01C 21/3492; G05D 1/0088; G08G 5/0082; G08G 5/04; G08G 7/00; G08G 5/06
(Continued)

(56) References Cited

U.S. PATENT DOCUMENTS

2009/0300428 A1* 12/2009 Matsumoto ......... G06F 11/0709
714/47.1
2012/0179361 A1* 7/2012 Mineta ............... G01C 21/3469
701/410
(Continued)

FOREIGN PATENT DOCUMENTS

JP    2010-000948 A     1/2010
JP    2012256242    * 12/2012
(Continued)

*Primary Examiner* — Muhammad Shafi
(74) *Attorney, Agent, or Firm* — Sughrue Mion, PLLC

(57) ABSTRACT

An automatic driving device includes a position acquisition unit configured to acquire position information on another automatically-driving vehicle and another manually-driving vehicle, a route searching unit configured to search a route, a calculation unit configured to calculate a ratio of the number of the other automatically-driving vehicles to a total number of all other vehicles on the route for each route based on the position information on the other automatically-driving vehicle and the position information on the other manually-driving vehicle when a plurality of routes is searched, a selection unit configured to select the route wherein the other automatically-driving vehicle ratio calculated by the calculation unit is highest as a route for the host vehicle to travel, and a control unit configured to control automatic driving of the host vehicle so travel along the selected route.

4 Claims, 9 Drawing Sheets

(51) Int. Cl.
*G05D 1/00* (2006.01)
*G08G 1/01* (2006.01)
(52) U.S. Cl.
CPC ....... *G01C 21/3492* (2013.01); *G05D 1/0088* (2013.01); *G08G 1/0112* (2013.01); *G08G 1/0125* (2013.01)
(58) Field of Classification Search
USPC .......................... 701/400–541; 340/988–996
See application file for complete search history.

(56) References Cited

U.S. PATENT DOCUMENTS

| 2015/0149019 | A1* | 5/2015 | Pilutti | G08G 1/22 701/23 |
| 2015/0254986 | A1* | 9/2015 | Fairfield | G08G 1/22 707/687 |

FOREIGN PATENT DOCUMENTS

| JP | 2012256242 A | 12/2012 |
| JP | 2014-506991 A | 3/2014 |

* cited by examiner

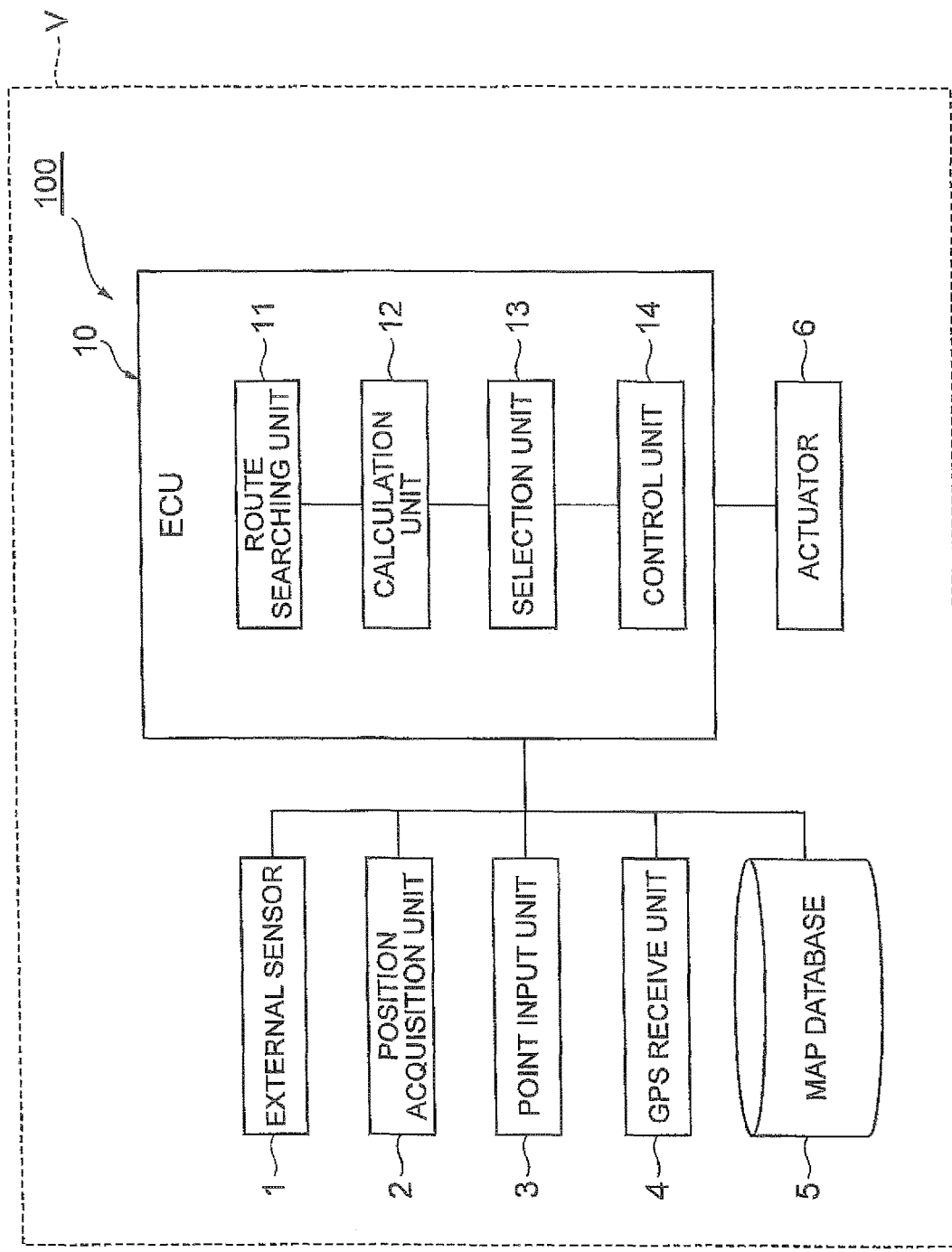

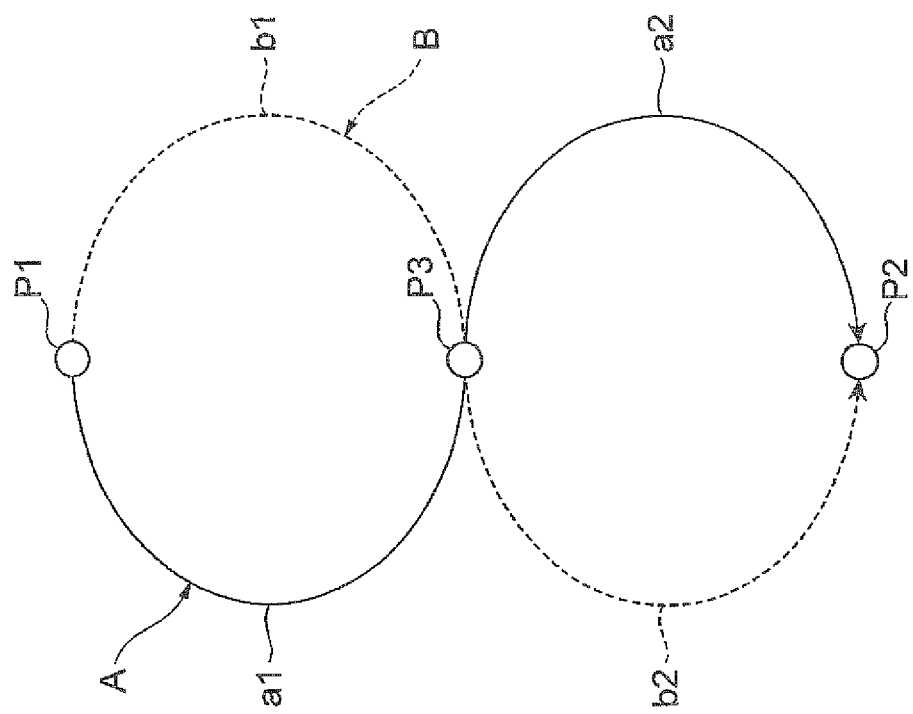
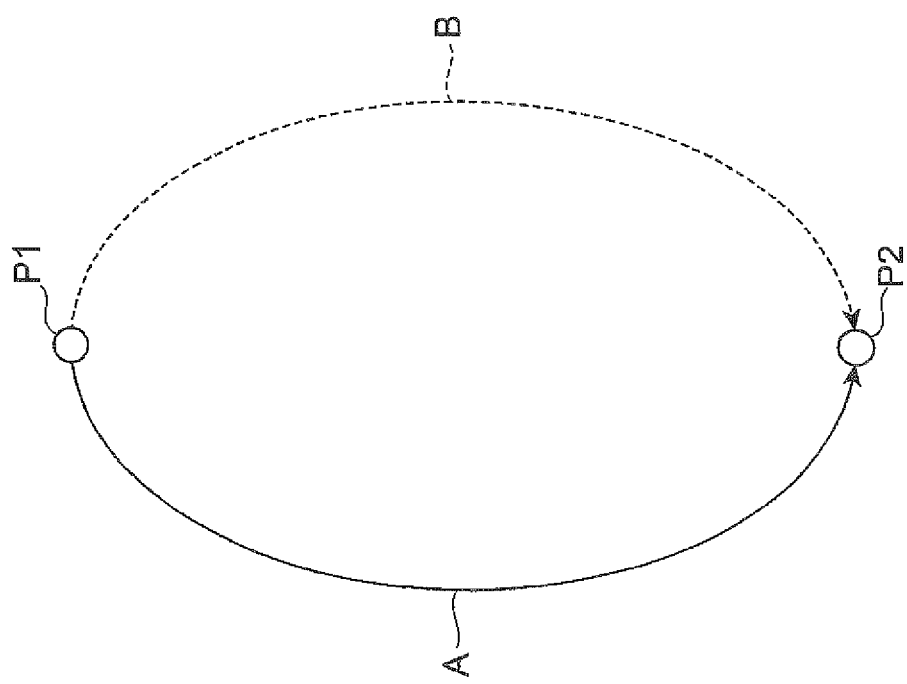

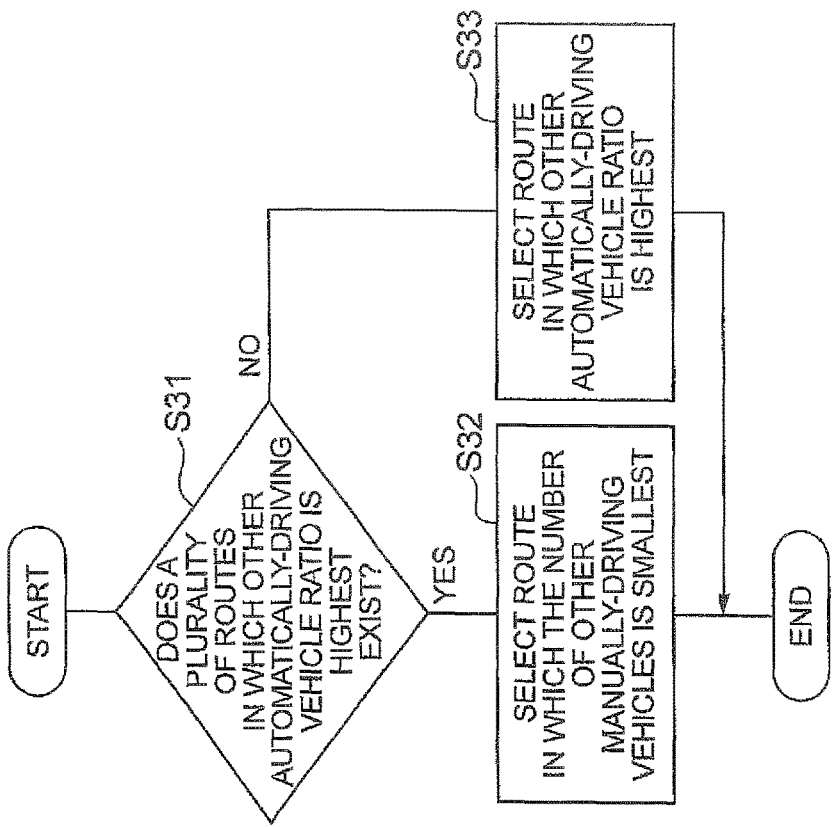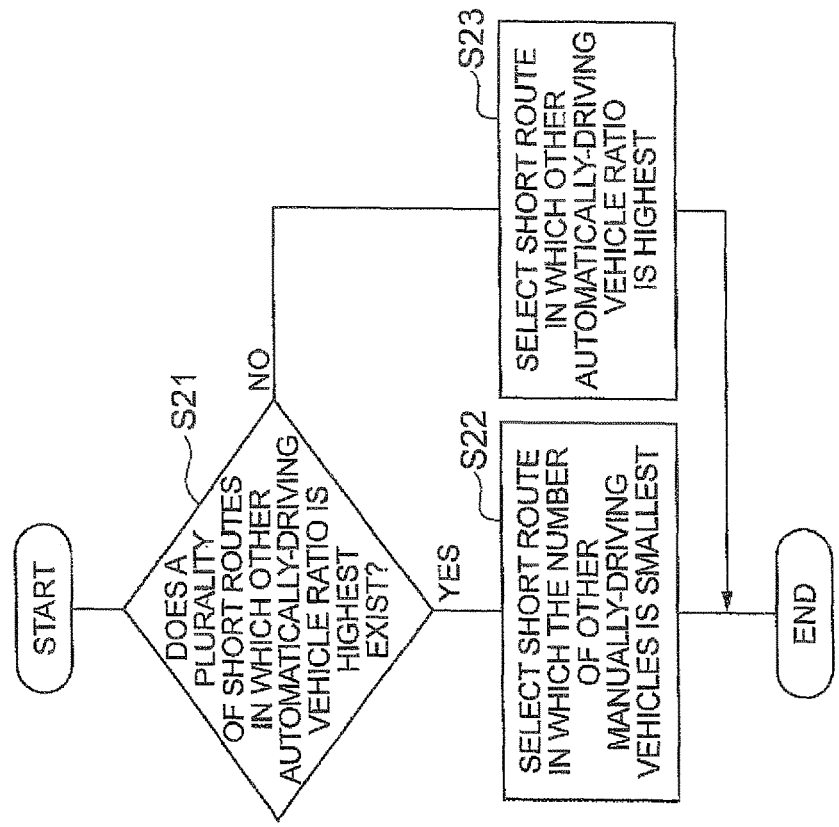

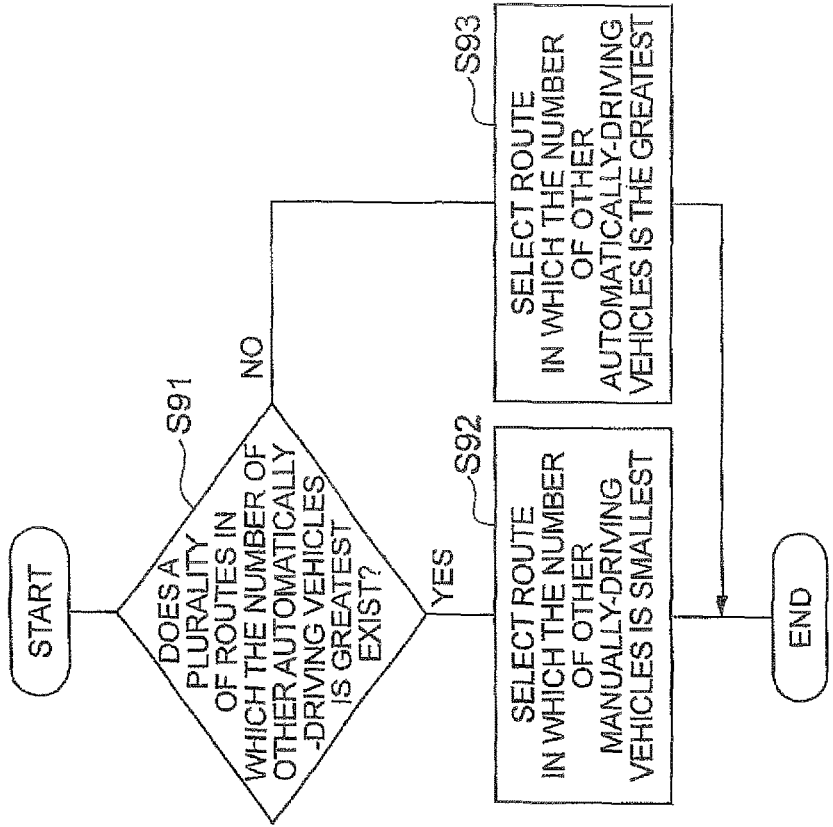
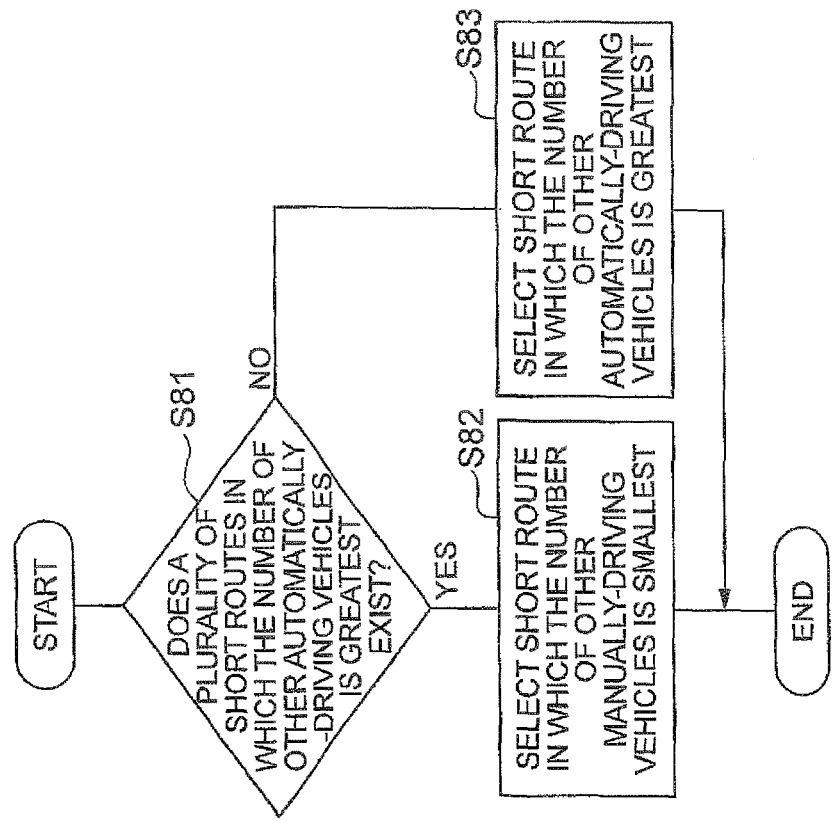

AUTOMATIC DRIVING DEVICE

CROSS-REFERENCE TO RELATED APPLICATIONS

This application is a divisional application of pending U.S. application Ser. No. 14/992,124, filed Jan. 11, 2016, which claims priority from Japanese Patent Application No. 2015-007761, filed on Jan. 19, 2015, the contents of all of which are incorporated herein by reference in their entirety.

BACKGROUND

Field

The present disclosure relates to an automatic driving device.

Related Background Art

There is an automatic driving device configured to cause a host vehicle to search for the route to a destination and to perform an automatic driving along the searched route. An example of a system for searching for the route to the destination is disclosed in Japanese Unexamined Patent Application Publication No. 2014-506991. In a case where a plurality of routes to the destination is searched, the system disclosed in Patent Literature 1 gives a priority to each route based on a length of the routes or the like, and selects an optimal route.

SUMMARY

Incidentally, the automatic driving device that performs the automatic driving of the host vehicle predicts a behavior of another vehicle and causes the host vehicle to travel based on the prediction result. The automatic driving device needs to perform a great deal of calculations for predicting the behavior of the other vehicle. In the above-described system for searching for the route in the related art, decreasing the amount of such calculation has not been considered.

Therefore, in the present technical field, in a case where a plurality of routes is searched, an automatic driving device that can select a route in which the amount of calculation relating to the automatic driving is low is required.

According to an aspect of an exemplary embodiment, there is provided an automatic driving device configured to select a route from a first point to a second point and perform an automatic driving of a host vehicle so as to travel along the selected route, the device including a first position acquisition unit configured to acquire position information on another automatically-driving vehicle which performs an automatic driving, a second position acquisition unit configured to acquire position information on another vehicle besides the other automatically-driving vehicle, a route searching unit configured to search a route from the first point to the second point based on map information, a calculation unit configured to calculate a ratio of the number of the other automatically-driving vehicles to a total number of all other vehicles on the route for each route based on the position information on the other automatically-driving vehicle acquired by the first position acquisition unit and the position information on the other vehicle acquired by the second position acquisition unit in a case where a plurality of routes is searched by the route searching unit, a selection unit configured to select the route in which the other automatically-driving vehicle ratio calculated by the calculation unit is the highest as a route for the host vehicle to travel, and a control unit configured to perform control of the automatic driving of the host vehicle such that the host vehicle travels along the route selected by the selection unit.

According to an aspect of an exemplary embodiment, in a case where a plurality of routes is searched, a route in which the other automatically-driving vehicle ratio is the highest is selected. Here, the automatic driving device performs a calculation for predicting the behavior of the other vehicle around the host vehicle at the time of travelling on the selected route and performs the automatic driving of the host vehicle based on the prediction result. In the other automatically-driving vehicle, it is possible to decrease the prediction range of the behavior of the vehicle compared to the other vehicle besides the other automatically-driving vehicle. For this reason, in the route in which the other automatically-driving vehicle ratio is high, it is possible to decrease the amount of calculation relating to the automatic driving. Therefore, according to the automatic driving device, in a case where a plurality of routes is searched, since the route in which the other automatically-driving vehicle ratio is the highest is selected, it is possible to select the route in which the amount of calculation relating to the automatic driving is small.

In a case where a plurality of routes in which the other automatically-driving vehicle ratio is the highest exists, the selection unit may select the route in which the number of the other vehicles besides the other automatically-driving vehicle is the smallest as a route for the host vehicle to travel. In this way, even in a case where a plurality of routes in which the other automatically-driving vehicle ratio is the highest exists, since the automatic driving device selects the route in which the number of the other vehicles besides the other automatically-driving vehicle is the smallest, it is possible to select the route in which the amount of calculation relating to the automatic driving is small.

According to another aspect of an exemplary embodiment, there is provided an automatic driving device configured to select a route from a first point to a second point and perform an automatic driving of a host vehicle so as to travel along the selected route, the device including a first position acquisition unit configured to acquire position information on another automatically-driving vehicle which performs an automatic driving, a route searching unit configured to search a route from the first point to the second point based on map information, a vehicle speed acquisition unit configured to acquire a vehicle speed of the other automatically-driving vehicle on which the position information is acquired by the first position acquisition unit, a vehicle-to-vehicle distance estimation unit configured to estimate a vehicle-to-vehicle distance on the route on which the other automatically-driving vehicle travels for each route based on the vehicle speed acquired by the vehicle speed acquisition unit, a calculation unit configured to calculate a total number of all other vehicles on the route for each route based on the distance for each route from the first point to the second point acquired by the map information and the vehicle-to-vehicle distance for each route estimated by the vehicle-to-vehicle distance estimation unit, and calculate the other automatically-driving vehicle ratio for each route based on the calculated total number and the position information on the other automatically-driving vehicle, a selection unit configured to select the route in which the other automatically-driving vehicle ratio calculated by the calculation unit is the highest as a route for the host vehicle to travel, and a control unit configured to perform control of the automatic driving of the host vehicle such that the host vehicle travels along the route selected by the selection unit.

According to an aspect of an exemplary embodiment, in a case where a plurality of routes is searched, the route in which the other automatically-driving vehicle ratio is the highest is selected. Here, the automatic driving device performs a calculation for predicting the behavior of the other vehicle around the host vehicle at the time of travelling on the selected route and performs the automatic driving of the host vehicle based on the prediction result. In the other automatically-driving vehicle, it is possible to decrease the prediction range of the behavior of the vehicle compared to the other vehicle besides the other automatically-driving vehicle. For this reason, in the route in which the other automatically-driving vehicle ratio is high, it is possible to decrease the amount of calculation relating to the automatic driving. Therefore, according to the automatic driving device, in a case where a plurality of routes is searched, since the route in which the other automatically-driving vehicle ratio is the highest is selected, it is possible to select the route in which the amount of calculation relating to the automatic driving is small. In addition, the automatic driving device can calculate the total number of all other vehicles on the route without using the position information on the vehicle besides the other automatically-driving vehicle.

According to still another aspect of an exemplary embodiment, there is provided an automatic driving device configured to select a route from a first point to a second point and automatically control a driving of a host vehicle so as to travel along the selected route, the device including a first position acquisition unit configured to acquire position information on another automatically-driving vehicle which performs the automatic driving, a route searching unit configured to search a route from the first point to the second point based on map information, a calculation unit configured to calculate the number of the other automatically-driving vehicles for each route based on the position information on the other automatically-driving vehicle in a case where a plurality of routes is searched by the route searching unit, a selection unit configured to select the route in which the number of the other automatically-driving vehicles calculated by the calculation unit is the greatest as a route for the host vehicle to travel, and a control unit configured to perform control of the automatic driving of the host vehicle such that the host vehicle travels along the route selected by the selection unit.

According to an aspect of an exemplary embodiment, in a case where a plurality of routes is searched, the route in which the number of the other automatically-driving vehicles is the greatest is selected. Here, the automatic driving device performs a calculation for predicting the behavior of the other vehicle around the host vehicle at the time of travelling on the selected route and performs the automatic driving of the host vehicle based on the prediction result. In the other automatically-driving vehicle, it is possible to decrease the prediction range of the behavior of the vehicle compared to the other vehicle besides the other automatically-driving vehicle. For this reason, in the route in which the number of the other automatically-driving vehicles is great, it is possible to decrease the amount of calculation relating to the automatic driving. Therefore, according to the automatic driving device, in a case where a plurality of routes is searched, since the route in which the number of the other automatically-driving vehicles is the greatest is selected, it is possible to select the route in which the amount of calculation relating to the automatic driving is small.

The automatic driving device further may include a second position acquisition unit configured to acquire position information on the other vehicle besides the other automatically-driving vehicle. In a case where a plurality of routes in which the number of the other automatically-driving vehicles is the greatest exists, the selection unit may select the route in which the number of the other vehicles besides the other automatically-driving vehicle is the smallest as a route for the host vehicle to travel. In this way, even in a case where a plurality of routes in which the number of the other automatically-driving vehicles is the greatest exists, since the automatic driving device selects the route in which the number of the other vehicles besides the other automatically-driving vehicle is the smallest, it is possible to select the route in which the amount of calculation relating to the automatic driving is small.

In various aspects of an exemplary embodiment, an automatic driving device can select the route in which the amount of calculation is small in a case where a plurality of routes is searched.

BRIEF DESCRIPTION OF THE DRAWINGS

FIG. 1 is a block diagram illustrating a configuration of an automatic driving device in a first embodiment.

FIG. 2A is a diagram illustrating a route that does not have a via-point on the way from a first point to a second point. FIG. 2B is a diagram illustrating a route that has a via-point on the way from the first point to the second point.

FIG. 4A is a flowchart illustrating a flow of processing in which a selection unit selects the route in a case where the via-point exists. FIG. 4B is a flowchart illustrating a flow of processing in which a selection unit selects the route in a case where the via-point does not exist.

FIG. 9A is a flowchart illustrating a flow of processing in which a selection unit selects the route in a case where the via-point exists. FIG. 9B is a flowchart illustrating a flow of processing in which a selection unit selects the route in a case where the via-point does not exist.

DESCRIPTION OF THE PREFERRED EMBODIMENTS

Figure 3:
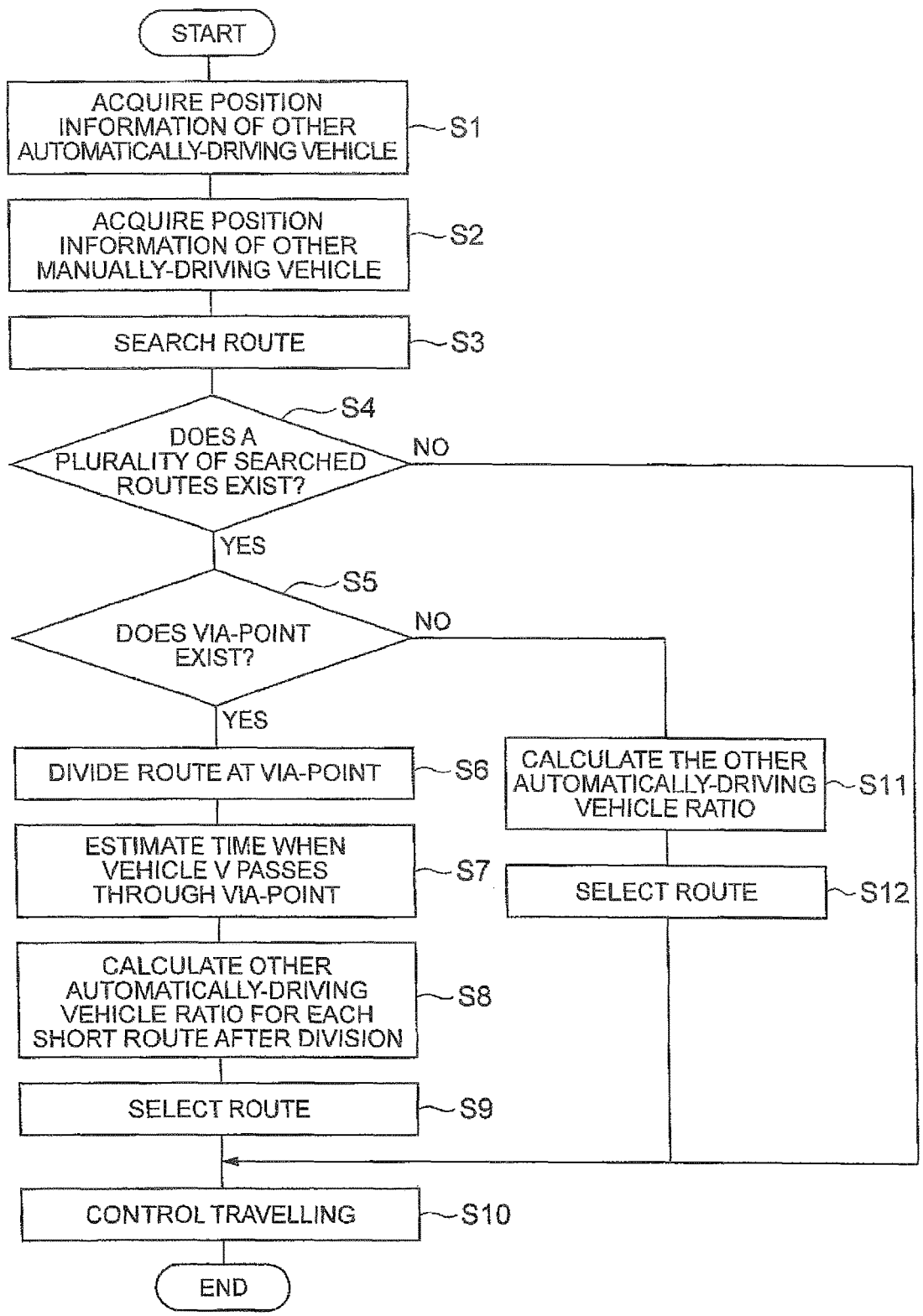
FIG. 3 is a flowchart illustrating a flow of processing performed in the automatic driving device.

Hereinafter, aspects of exemplary embodiments will be described with reference to the drawings. In the description of the drawings, the same reference signs will be given to the same elements and the description thereof will not be repeated.

First Embodiment

First, a first embodiment will be described. As illustrated in FIG. 1, an automatic driving device 100 is mounted on a vehicle (host vehicle) V such as an automobile. The vehicle V performs an automatic driving along a selected route. The automatic driving device 100 includes an external sensor 1, a position acquisition unit 2 (a first position acquisition unit and a second position acquisition unit), a point input unit 3, a global positioning system (GPS) receiver unit 4, a map database 5, an actuator 6, and an electronic control unit (ECU) 10.

The external sensor 1 is a detection device configured to detect an external situation which is peripheral information to the vehicle V. The external sensor 1 includes at least one of a camera, a radar, a laser imaging detection and ranging device (LIDAR), and the like. The camera is an imaging device configured to image the external situation of the vehicle V.

The camera is, for example, provided on the back side of front glass of the vehicle V. The camera transmits the image information relating to the external situation of the vehicle V to the ECU 10. The camera may be a monocular camera or may be a stereo camera. The stereo camera has two imaging units that are arranged so as to reproduce a binocular parallax. In the image information by the stereo camera includes information in the depth direction as well.

The radar detects an obstacle outside of the vehicle V using a radio wave (for example, a millimeter wave). The radar detects the obstacle by transmitting the radio wave surrounding the vehicle V and receiving the radio wave reflected from the obstacle. The radar transmits detected obstacle information to the ECU 10.

The LIDAR detects the obstacle outside the vehicle V using a light. The LIDAR transmits the light to the surroundings of the vehicle V, measures the distance to the reflection point by receiving the light reflected from the obstacle, and then, detects the obstacle. The LIDAR transmits the detected obstacle information to the ECU 10. The camera, the LIDAR, and the radar are not necessarily provided in an overlapping manner.

The position acquisition unit 2 performs communications with an information center installed outside of the vehicle V, and acquires position information on another automatically-driving vehicle and position information on the other vehicle besides the other automatically-driving vehicle. The other automatically-driving vehicle means a vehicle besides the vehicle V that performs an automatic driving. The other vehicle besides the other automatically-driving vehicle means a vehicle besides the vehicle V and a vehicle besides the vehicle performing an automatic driving. That is, the other vehicle besides the other automatically-driving vehicle is a vehicle on which a driving operation by a driver is performed. Hereinafter, the other vehicle besides the other automatically-driving vehicle is referred to as another manually-driving vehicle.

In the position information on the other automatically-driving vehicle, a position (for example, latitude and longitude) of each point on the travelling route of the other automatically-driving vehicle and a time when the other automatically-driving vehicle passes through each point are included. The position of each point on the route includes a current position of the other automatically-driving vehicle and a position of each point on the scheduled travelling route of the other automatically-driving vehicle. In the position information on the other manually-driving vehicle, a position (for example, latitude and longitude) of each point on the travelling route of the other manually-driving vehicle and a time when the other manually-driving vehicle passes through each point are included. The position of each point on the route includes a current position of the other manually-driving vehicle and a position of each point on the scheduled travelling route of the other manually-driving vehicle.

Here, the other automatically-driving vehicle transmits a signal indicating the automatic driving and the position information to the information center in association with each other. More specifically, the other automatically-driving vehicle uses, for example, the current position of the other automatically-driving vehicle and the position of each point on the route set by the automatic driving device performing the automatic driving and the time of passing through each point, as the position information transmitted to the information center. The position of each point on the route and the time of passing through each point are associated with each other in advance for each point by the automatic driving device of the other automatically-driving vehicle. The other automatically-driving vehicle associates the current position of the other automatically-driving vehicle with the current time. The other automatically-driving vehicle transmits the signal indicating the automatic driving and the associated position and the time to the information center.

The other manually-driving vehicle transmits a signal indicating the manual driving and the position information to the information center in association with each other. More specifically, the other manually-driving vehicle uses, for example, the current position of the other manually-driving vehicle and the position of each point on the route set by the navigation device and the time of passing through each point, as the position information transmitted to the information center. The position of each point on the route and the time of passing through each point are associated with each other in advance for each point by the navigation device of the other manually-driving vehicle. The other manually-driving vehicle associates the current position of the other manually-driving vehicle with the current time. The other manually-driving vehicle transmits the signal indicating the manual driving and the associated position and the time to the information center.

The information center performs the communications with a plurality of the other automatically-driving vehicles and acquires and stores the signal indicating the automatic driving and the position information on the other automatically-driving vehicle. In addition, the information center performs communications with a plurality of the other manually-driving vehicles and acquires and stores the signal indicating the manual driving and the position information on the other manually-driving vehicle.

More specifically, the position acquisition unit 2 acquires the position information on the other automatically-driving vehicle and the signal indicating the automatic driving, and the position information on the other manually-driving vehicle and the signal indicating the manual driving. In this way, the position acquisition unit 2 can determine whether the acquired position information is the position information on the other automatically-driving vehicle or the position information on the other manually-driving vehicle.

The position acquisition unit 2 is not limited to acquiring both of the signal indicating the automatic driving and the signal indicating the manual driving. For example, in a case where only the signal indicating the automatic driving is associated with the position information, the position acquisition unit 2 may determine that the position information with which the signal indicating the automatic driving is not associated as the position information on the other manually-driving vehicle.

The position acquisition unit 2 may acquire the position information on the other automatically-driving vehicle and the position information on the other manually-driving vehicle existing within a predetermined region including the route searched by a route searching unit 11 described below. Alternatively, the position acquisition unit 2 may acquire the position information on the other automatically-driving vehicle and the position information on the other manually-driving vehicle existing within a predetermined range from the searched route based on the route searched by the route searching unit 11. The position acquisition unit 2 may perform the communications with the information center via a communication line such as the Internet.

The position acquisition unit 2 is not limited to acquiring the position information from the information center. For example, the position acquisition unit 2 may perform vehicle-to-vehicle communications between the other automatically-driving vehicle and the other manually-driving vehicle, and then, may acquire the signal indicating the automatic driving and the signal indicating the manual driving, and the position information.

The point input unit 3 receives the input of the first point which is the start point of the route and the second point which is the end point of the route on which the vehicle V travels. The point input unit 3 is a device operated by a driver of the vehicle V, and may receive the input of the first point and the second point based on the operation of the driver. Alternatively, the point input unit 3 may receive the input of the first point and the second point from another device or the like.

The GPS receiving unit 4 measures the position of the vehicle V (for example, the latitude and the longitude of the vehicle V) by receiving signals from three or more GPS satellites. The GPS receiving unit 4 transmits the measured position information on the vehicle V to the ECU 10. Instead of the GPS receiving unit 4, another means for specifying the latitude and the longitude of the vehicle V may be used.

The map database 5 is a database in which map information is included. The map database 5 is formed, for example, in a hard disk drive (HDD) mounted on the vehicle. In the map information, for example, position information on the road, type information on the road (for example, type of a curve or a straight portion or a curvature of the curve), position information on the intersection, and the branch point are included. The map database 5 may be stored in a computer in the facility such as an information processing center which is capable of communicating with vehicle V.

The actuator 6 is a device configured to perform a travel control of the vehicle V. The actuator 6 includes at least a throttle actuator, a brake actuator, and a steering actuator. The throttle actuator controls a supply amount (throttle opening degree) of air to an engine according to the control signal from the ECU 10, and controls the driving force of the vehicle V. In a case where the vehicle V is a hybrid vehicle or an electric vehicle, the throttle actuator is not included and the driving force is controlled by the control signal input to a motor as a source of the driving force from the ECU 10.

The brake actuator controls a brake system according to the control signal from the ECU 10 and controls the braking force given to the wheels of the vehicle V. For example, a hydraulic brake system can be used as the brake system. The steering actuator controls the driving of an assist motor that controls a steering torque in the electric power steering system according to the control signal from the ECU 10. In this way, the steering actuator controls the steering torque of the vehicle V.

The ECU 10 controls the automatic driving of the vehicle V. The ECU 10 is an electronic control unit including a central processing unit (CPU), read only memory (ROM), random access memory (RAM), and the like. In the ECU 10, various controls are performed by loading the program stored in the ROM into the RAM and executing the program by the CPU. The ECU 10 may be configured with a plurality of electronic control units.

The ECU 10 includes the route searching unit 11, a calculation unit 12, a selection unit 13, and a control unit 14. The route searching unit 11 searches for one or a plurality of routes from the first point to the second point received by the point input unit 3 based on the map information stored in the map database 5. In a case where the current position is input as the first point or the second point, the route searching unit 11 can use the position measured by the GPS receiving unit 4 as the first point or the second point. The route searching unit 11 may search the route from the first point to the second point while considering at least any of, for example, the shortest distance, fuel consumption (a gradient, a curve, and a stop frequency), a required time, and a congestion status.

In a case where the plurality of routes are searched by the route searching unit 11, the calculation unit 12 calculates a ratio of the number of the other automatically-driving vehicles to the total number of all other vehicles on the routes for each route based on the position information on the other automatically-driving vehicle and the position information on the other manually-driving vehicle acquired by the position acquisition unit 2. Hereinafter, in some cases, "the ratio of the number of automatically-driving vehicles to the total number of all other vehicles on the routes" may be referred to simply as "the other automatically-driving vehicle ratio".

Here, when the plurality of routes are searched by the route searching unit 11, there are two cases in which the via-point does not exist on the route and in which the via-point exists. The via-point means a point where the routes intersect each other and routes can be switched with each other.

For example, as illustrated in FIG. 2A, a first route A indicated in a solid line and a second route B indicated in a dashed line are assumed to be searched as the route from the first point P1 to the second point P2 by the route searching unit 11. The first route A and the second route B do not intersect each other. In this case, the via-point in which the first route A and the second route B can be switched does not exist on the first route A and the second route B. For example, as illustrated in FIG. 2B, a first route A indicated in a solid line and a second route B indicated in a dashed line are assumed to be searched as the route from the first point P1 to the second point P2 by the route searching unit 11. The first route A and the second route B intersect each other, and the vehicle transfer routes at the point where the first route A and the second route B intersect. The point where the first route A and the second route B intersect each other is a via-point P3. Hereinafter, when the plurality of routes are searched by the route searching unit 11, the process of calculating the other automatically-driving vehicle ratio by the calculation unit 12 will be described in two cases where the via-point does not exist and where the via-point exists.

[The Case where the Via-Point does not Exist]

The process of calculating the other automatically-driving vehicle ratio by the calculation unit 12 in a case where the plurality of routes are searched by the route searching unit 11 and the via-point does not exist on the searched route, will be described with the case illustrated in FIG. 2A as an example. Here, the current position of the vehicle V is the first point P1. The destination of the vehicle V which travels by the automatic driving is the second point P2.

First, the calculation unit 12 calculates the number of all other automatically-driving vehicles on the first route A and the number of all other automatically-driving vehicles on the second route B based on the position information on the other automatically-driving vehicles acquired by the position acquisition unit 2. When calculating the number of the other automatically-driving vehicles on the first route A and the number of the other automatically-driving vehicles on the second route B, the calculation unit 12 determines whether or not the other automatically-driving vehicle exists on the first route A and whether or not it exists on the second route B based on the position associated with the current time among the position information on the other automatically-driving vehicle. Based on the determination result, the calculation unit 12 calculates the number of the other automatically-driving vehicles on the first route A and the number of the other automatically-driving vehicles on the second route B.

When calculating the number of the other automatically-driving vehicles, the calculation unit 12 is not limited to using the position associated with the current time, and may use the position associated with the time within a predetermined range from the current time. In addition, the calculation unit 12 may use the position associated with the time closest to the current time, among the position information for each of the other automatically-driving vehicles.

Similarly, the calculation unit 12 calculates the number of all other manually-driving vehicles on the first route A and the number of all other manually-driving vehicles on the second route B based on the position information on the other manually-driving vehicle acquired by the position acquisition unit 2. When calculating the number of the other manually-driving vehicles on the first route A and the number of the other manually-driving vehicles on the second route B, the calculation unit 12 determines whether or not the other manually-driving vehicle exists on the first route A and whether or not it exists on the second route B based on the position associated with the current time among the position information on the other manually-driving vehicle. Based on the determination result, the calculation unit 12 calculates the number of the other manually-driving vehicles on the first route A and the number of the other manually-driving vehicles on the second route B.

When calculating the number of the other manually-driving vehicles, the calculation unit 12 is not limited to using the position associated with the current time, and may use the position associated with the time within a predetermined range from the current time. In addition, the calculation unit 12 may use the position associated with the time closest to the current time, among the position information for each of the other manually-driving vehicles.

The calculation unit 12 calculates the total number of all other vehicles on the first route A based on the calculated number of the other automatically-driving vehicles on the first route A and the calculated number of the other manually-driving vehicles on the first route A. For example, the calculation unit 12 can calculate the total number of all other vehicles by adding the number of the other manually-driving vehicles to the number of the other automatically-driving vehicles. Similarly, the calculation unit 12 calculates the total number of all other vehicles on the second route B based on the calculated number of the other automatically-driving vehicles on the second route B and the calculated number of the other manually-driving vehicles on the second route B.

Next, the calculation unit 12 calculates the ratio of the number of the other automatically-driving vehicles to the total number of all other vehicles on the first route A based on the calculated number of the other automatically-driving vehicles on the first route A and the calculated total number of all other vehicles on the first route A. Similarly, the calculation unit 12 calculates the ratio of the number of the other automatically-driving vehicles to the total number of all other vehicles on the second route B based on the calculated number of the other automatically-driving vehicles on the second route B and the calculated total number of all other vehicles on the second route B.

[The Case where the Via-Point Exists]

The process of calculating the other automatically-driving vehicle ratio by the calculation unit 12 in a case where the plurality of routes are searched and the via-point P3 exists on the searched route by the route searching unit 11, will be described with the case illustrated in FIG. 2B as an example. Here, the current position of the vehicle V is the first point P1. The destination of the vehicle V which travels by the automatic driving is the second point P2.

First, the calculation unit 12 divides the route searched by the route searching unit 11 into two routes respectively at the via-point. Specifically, in the example illustrated in FIG. 2B, the calculation unit 12 divides the first route A into a short route a1 from the first point P1 to the via-point P3 and a short route a2 from via-point P3 to the second point P2. Similarly, the calculation unit 12 divides the second route B into a short route b1 from the first point P1 to the via-point P3 and a short route b2 from via-point P3 to the second point P2.

Next, the calculation unit 12 calculates the number of all other automatically-driving vehicles on the short route a1 and the number of all other automatically-driving vehicles on the short route b1 based on the position information on the other automatically-driving vehicles acquired by the position acquisition unit 2. When calculating the number of the other automatically-driving vehicles on the short route a1 and the number of the other automatically-driving vehicles on short route b1, the calculation unit 12 determines whether or not the other automatically-driving vehicle exists on the short route a1 and whether or not it exists on the short route b1 based on the position associated with the current time among the position information on the other automatically-driving vehicle. Based on the determination result, the calculation unit 12 calculates the number of the other automatically-driving vehicles on the short route a1 and the number of the other automatically-driving vehicles on the short route b1.

When calculating the number of the other automatically-driving vehicles, the calculation unit 12 is not limited to using the position associated with the current time, and may use the position associated with the time within a predetermined range from the current time. In addition, the calculation unit 12 may use the position associated with the time closest to the current time, among the position information for each of the other automatically-driving vehicles.

Similarly, the calculation unit 12 calculates the number of all other manually-driving vehicles on the short route a1 and the number of all other manually-driving vehicles on the short route b1 based on the position information on the other manually-driving vehicle acquired by the position acquisition unit 2. When calculating the number of the other manually-driving vehicles on the short route a1 and the number of the other manually-driving vehicles on the short route b1, the calculation unit 12 determines whether or not the other manually-driving vehicle exists on the short route a1 and whether or not it exists on the short route b1 based on the position associated with the current time among the position information on the other manually-driving vehicle. Based on the determination result, the calculation unit 12 calculates the number of the other manually-driving vehicles on the short route a1 and the number of the other manually-driving vehicles on the short route b1.

When calculating the number of the other manually-driving vehicles, the calculation unit 12 is not limited to using the position associated with the current time, and may use the position associated with the time within a predetermined range from the current time. In addition, the calculation unit 12 may use the position associated with the time closest to the current time, among the position information for each of the other manually-driving vehicles.

The calculation unit 12 calculates the total number of all other vehicles on the short route a1 based on the calculated number of the other automatically-driving vehicles on the short route a1 and the calculated number of the other manually-driving vehicles on the short route a1. Similarly, the calculation unit 12 calculates the total number of all other vehicles on the short route b1 based on the calculated number of the other automatically-driving vehicles on the short route b1 and the calculated number of the other manually-driving vehicles on the short route b1.

Next, the calculation unit 12 calculates the ratio of the number of the other automatically-driving vehicles to the total number of all other vehicles on the short route a1 based on the calculated number of the other automatically-driving vehicles on the short route a1 and the calculated total number of all other vehicles on the short route a1. Similarly, the calculation unit 12 calculates the ratio of the number of the other automatically-driving vehicles to the total number of all other vehicles on the short route b1 based on the calculated number of the other automatically-driving vehicles on the short route b1 and the calculated total number of all other vehicles on the short route b1.

Next, the calculation unit 12 calculates the ratio of the number of the other automatically-driving vehicles to the total number of all other vehicles on the short route a2, and the ratio of the number of the other automatically-driving vehicles to the total number of all other vehicles on the short route b2. When calculating the ratio, the calculation unit 12 calculates the ratio based on the positions of the other automatically-driving vehicle and the other manually-driving vehicle at the time at which the vehicle V passes through the via-point P3 which is the start point of the short route a2 and the short route b2.

Specifically, first, the calculation unit 12 estimates the time at which the vehicle V passes through the via-point P3. As an example, the above-described time may be a time of passing the via-point P3 in a case where the vehicle V travels on the short route selected by the selection unit 13 among the short route a1 and the short route b1. Alternatively, the above-described time may be a time calculated based on at least any of the time of passing through the via-point P3 in a case of travelling the short route a1 or the time of passing through the via-point P3 in a case of traveling the short route b1.

As an example, in a case of calculating an estimated time passing through each point when the route searching unit 11 searches for the route, the calculation unit 12 may use the estimated passing time through a point corresponding to the via-point P3 among the estimated passing time calculated by the route searching unit 11. Alternatively, in a case where information relating to the distance is included in the map information prepared in the map database 5, the calculation unit 12 may calculate the distance from the first point P1 to the via-point P3 based on the map information, and then, may estimate the time at which the vehicle V passes through the via-point P3 based on the calculated distance and the vehicle speed.

The calculation unit 12 calculates the number of all other automatically-driving vehicles on the short route a2 and the number of all other automatically-driving vehicles on the short route b2 based on the position information on the other automatically-driving vehicle acquired by the position acquisition unit 2. When calculating the number of the other automatically-driving vehicles on the short route a2 and the number of the other automatically-driving vehicles short route b2, the calculation unit 12 determines whether or not the other automatically-driving vehicle exists on the short route a2 and whether or not it exists on the short route b2 based on the position associated with the time at which the vehicle V is estimated to pass through the via-point P3 among the position information on the other automatically-driving vehicle. Based on the determination result, the calculation unit 12 calculates the number of the other automatically-driving vehicles on the short route a2 and the number of the other automatically-driving vehicles on the short route b2.

When calculating the number of the other automatically-driving vehicles, the calculation unit 12 is not limited to using the position associated with the time at which the vehicle V is estimated to pass through the via-point P3, and may use the position associated with the time within a predetermined range from the estimated time. In addition, the calculation unit 12 may use the position associated with the time closest to the estimated time, among the position information for each of the other automatically-driving vehicles.

Similarly, the calculation unit 12 calculates the number of all other manually-driving vehicles on the short route a2 and the number of all other manually-driving vehicles on the short route b2 based on the position information on the other manually-driving vehicle acquired by the position acquisition unit 2. When calculating the number of the other manually-driving vehicles on the short route a2 and the number of the other manually-driving vehicles on the short route b2, the calculation unit 12 determines whether or not the other manually-driving vehicle exists on the short route a2 and whether or not it exists on the short route b2 based on the position associated with the time at which the vehicle V is estimated to pass through the via-point P3 among the position information on the other manually-driving vehicle. Based on the determination result, the calculation unit 12 calculates the number of the other manually-driving vehicles on the short route a2 and the number of the other manually-driving vehicles on the short route b2.

When calculating the number of the other manually-driving vehicles, the calculation unit 12 is not limited to using the position associated with the time at which the vehicle V is estimated to pass through the via-point P3, and may use the position associated with the time within a predetermined range from the estimated time. In addition, the calculation unit 12 may use the position associated with the time closest to the estimated time, among the position information for each of the other manually-driving vehicles.

The calculation unit 12 calculates the total number of all other vehicles on the short route a2 based on the calculated number of the other automatically-driving vehicles on the short route a2 and the calculated number of the other manually-driving vehicles on the short route a2. Similarly, the calculation unit 12 calculates the total number of all other vehicles on the short route b2 based on the calculated number of the other automatically-driving vehicles on the short route b2 and the calculated number of the other manually-driving vehicles on the short route b2.

Next, the calculation unit 12 calculates the ratio of the number of the other automatically-driving vehicles to the total number of all other vehicles on the short route a2 based on the calculated number of the other automatically-driving vehicles on the short route a2 and the calculated total number of all other vehicles on the short route a2. Similarly, the calculation unit 12 calculates the ratio of the number of the other automatically-driving vehicles to the total number of all other vehicles on the short route b2 based on the calculated number of the other automatically-driving vehicles on the short route b2 and the calculated total number of all other vehicles on the short route b2.

In FIG. 2B, the case of one via-point is illustrated, but a plurality of via-points may exist. Even in a case where the plurality of via-points exist, as similar to the case of calculating the ratio of the other automatically-driving vehicle on the short route a2 and the short route b2, the other automatically-driving vehicle ratio may be calculated based on the positions of the other automatically-driving vehicle and the other manually-driving vehicle associated with the time at which the vehicle V passes through the via-point which is the start point of the short route.

In a case where a plurality of routes is searched by the route searching unit 11, the selection unit 13 selects the route in which the calculated ratio is the highest as the route for the vehicle V to travel based on the other automatically-driving vehicle ratio calculated by the calculation unit 12. Hereinafter, when the plurality of routes is searched by the route searching unit 11, the process of selecting the route by the selection unit 13 will be described in two cases where the via-point does not exist and where the via-point exists.

[The Case where the Via-Point does not Exist]

The process of selecting the route by the selection unit 13 in a case where the plurality of routes are searched by the route searching unit 11 and the via-point does not exist on the searched route, will be described with the case illustrated in FIG. 2A as an example. The selection unit 13 selects the route in which the ratio is higher among the first route A and the second route B as the route for vehicle V to travel based on the ratio of the number of the other automatically-driving vehicles to the total number of all other vehicles on the first route A and the ratio of the number of the other automatically-driving vehicles to the total number of all other vehicles on the second route B calculated by the calculation unit 12.

[The Case where the Via-Point Exists]

The process of selecting the route by the selection unit 13 in a case where the plurality of routes are searched by the route searching unit 11 and the via-point P3 exists on the searched route, will be described with the case illustrated in FIG. 2B as an example.

First, the selection unit 13 selects the route from the first point P1 to the via-point P3. Specifically, the selection unit 13 selects the route in which the ratio is higher among the short route a1 and the short route b1 as the route for vehicle V to travel based on the ratio of the number of the other automatically-driving vehicles to the total number of all other vehicles on the short route a1 and the ratio of the number of the other automatically-driving vehicles to the total number of all other vehicles on the short route b1 calculated by the calculation unit 12.

Next, the selection unit 13 selects the route from the via-point P3 to the second point P2. Specifically, the selection unit 13 selects the route in which the ratio is higher among the short route a2 and the short route b2 as the route for vehicle V to travel based on the ratio of the number of the other automatically-driving vehicles to the total number of all other vehicles on the short route a2 and the ratio of the number of the other automatically-driving vehicles to the total number of all other vehicles on the short route b2 calculated by the calculation unit 12.

In this way, in a case where the via-point P3 exists, for example, the route on which the vehicle V travels is switched from the first route A to the second route B on the via-point P3 is selected as the route for the vehicle to travel. Specifically, for example, from the first point P1 to the via-point P3, the short route a1 is selected, and from the via-point P3 to the second point P2, the short route b2 is selected.

In a case where a plurality of routes or the short routes in which the other automatically-driving vehicle ratio is the highest exists, the selection unit 13 may select the route or the short route in which the number of the other manually-driving vehicles is the smallest among the plurality of routes or the short routes in which the other automatically-driving vehicle ratio is the highest as the route for the vehicle V to travel.

The control unit 14 performs the automatic driving such that the vehicle V travels along the route selected by the selection unit 13. Specifically, the control unit 14 performs a calculation for predicting the behavior of the other vehicle around the vehicle V based on the external situation detected by the external sensor 1. Then, the control unit 14 generates a travel plan to travel along the route selected by the selection unit 13 based on at least the prediction result of the behavior of the other vehicle and the map information in the map database 5. The control unit 14 automatically controls the travelling of the vehicle V based on the generated travel plan. That is, the control unit 14 outputs a control signal according to the travel plan to the actuator 6. In this way, the control unit 14 performs the automatic driving of the vehicle V such that the vehicle V automatically travels according to the travel plan. In a case where the plurality of routes are not searched by the route searching unit 11, the control unit 14 performs the automatic driving of the vehicle V such that the vehicle V travels along the route searched by the route searching unit 11.

Next, the processing tasks executed in the automatic driving device 100 will be described in detail with reference to a flowchart in FIG. 3. The processing tasks described below are performed after the first point and the second point are received by the point input unit 3.

As illustrated in FIG. 3, the position acquisition unit 2 performs communications with the information center, acquires the position information on the other automatically-driving vehicle (S1), and further, acquires the position information on the other manually-driving vehicle (S2). The route searching unit 11 searches for the route from the first point to the second point received from the point input unit 3 based on the map information stored in the map database 5 (S3).

The calculation unit 12 determines whether or not a plurality of routes searched by the route searching unit 11 exists (S4). In a case where a plurality of searched routes exist (YES in S4), the calculation unit 12 determines whether or not the via-point exists on the plurality of searched routes (S5). In a case where the via-point exists (YES in S5), the calculation unit 12 divides the route into two routes at the via-point (S6). The calculation unit 12 estimates the time at which the vehicle V passes through the via-point (S7).

The calculation unit 12 calculates the other automatically-driving vehicle ratio for each short route after division (S8). The selection unit 13 selects the route for the vehicle V to travel among the plurality of short routes toward the second point in each point of the first point and the via-point (S9). Here, the details of selecting the route by the selection unit 13 will be described using the flowchart illustrated in FIG. 4A. As illustrated in FIG. 4A, the selection unit 13 determines whether or not a plurality of short routes in which the other automatically-driving vehicle ratio is the highest exists among the plurality of short routes toward the second point in each point of the first point and the via-point (S21). In a case where the plurality of short routes in which the other automatically-driving vehicle ratio is the highest exists (YES in S21), the selection unit 13 selects the short route in which the number of the other manually-driving vehicles is the smallest as the route for the vehicle V to travel (S22). In a case where the plurality of short routes in which the other automatically-driving vehicle ratio is the highest does not exist (NO in S21), the selection unit 13 selects the short route in which the other automatically-driving vehicle ratio is the highest as the route for the vehicle V to travel (S23). After the route is selected by the selection unit 13, the control unit 14 performs the automatic driving such that the vehicle V travels along the route selected by the selection unit 13 (S10).

In S4 described above, in a case where a plurality of searched routes does not exist (NO in S4), the control unit 14 performs the automatic driving such that the vehicle V travels along the route searched by the route searching unit 11 (S10).

In S5 described above, in a case where the via-point not exist (NO in S5), the calculation unit 12 calculates the ratio of the number of the other automatically-driving vehicles to the total number of all other vehicles on the route for each route searched by the route searching unit 11 (S11). The selection unit 13 selects the route for the vehicle V to travel based on the ratio calculated by the calculation unit 12 (S12). Here, the details of selecting the route by the selection unit 13 will be described using the flowchart illustrated in FIG. 4B. As illustrated in FIG. 4B, the selection unit 13 determines whether or not a plurality of routes in which the other automatically-driving vehicle ratio is the highest exists among the plurality of routes from the first point to the second point (S31). In a case where the plurality of routes in which the other automatically-driving vehicle ratio is the highest exists (YES in S31), the selection unit 13 selects the route in which the number of the other manually-driving vehicle is the smallest as the route for the vehicle V to travel (S32). In a case where the plurality of routes in which the other automatically-driving vehicle ratio is the highest does not exist (NO in S31), the selection unit 13 selects the route in which the other automatically-driving vehicle ratio is the highest as the route for the vehicle V to travel (S33). After the route is selected by the selection unit 13, the control unit 14 performs the automatic driving such that the vehicle V travels along the route selected by the selection unit 13 (S10).

As described above, in a case where a plurality of routes is searched, the automatic driving device 100 in the present embodiment selects the route in which the other automatically-driving vehicle ratio is the highest. Here, the control unit 14 performs the calculation for predicting the behavior of the other vehicle around the vehicle V at the time of travelling on the selected route, and performs the automatic driving of the vehicle V based on the prediction result. In the other automatically-driving vehicle, it is possible to decrease the range of predicting the behavior of the vehicle compared to the other manually-driving vehicle. For this reason, in the route in which the other automatically-driving vehicle ratio is high, it is possible to decrease the amount of calculation relating to the automatic driving. Therefore, according to the automatic driving device 100, in a case where a plurality of routes is searched, since the route in which the other automatically-driving vehicle ratio is the highest is selected, it is possible to select the route in which the amount of calculation relating to the automatic driving is small.

In a case where a plurality of routes in which the other automatically-driving vehicle ratio is the highest exists, the selection unit 13 selects the route in which the number of the other manually-driving vehicles is the smallest as the route for the vehicle V to travel. In this way, even in a case where a plurality of routes in which the other automatically-driving vehicle ratio is the highest exists, since the automatic driving device 100 selects the route in which the number of the other manually-driving vehicles is the smallest, it is possible to select the route in which the amount of calculation relating to the automatic driving is small.

In a case where the via-point exists on the plurality of searched routes, the calculation unit 12 calculates the other automatically-driving vehicle ratio on the short route in which the via-point is the start point based on the time at which the vehicle V passes through the via-point. In this way, the automatic driving device 100 can calculate the other automatically-driving vehicle ratio with high accuracy while considering the time at which the vehicle V reaches the via-point.

A first exemplary embodiment is described as above. However, the exemplary embodiments are not limited thereto. For example, the automatic driving device 100 may not select the route considering the via-point. Specifically, the automatic driving device 100 may not execute the processing tasks illustrated in S5 to S9 in FIG. 3. That is, in a case where a plurality of routes is searched by the route searching unit 11 (YES in S14), the calculation unit 12 executes the processing in S11.

When calculating the other automatically-driving vehicle ratio, the calculation unit 12 may calculate the ratio based on the position associated with a predetermined time in the past among the position information on the other automatically-driving vehicle and the position information on the other manually-driving vehicle. In addition, as examples, the calculation unit 12 may calculate the other automatically-driving vehicle ratio for each day or for each time period, the other automatically-driving vehicle ratio on the weekdays and the holidays, or the ratio in a case where there is an event in the surrounding area and a case where there is no event in advance based on the position information on the other automatically-driving vehicle in the past and the position information on the other manually-driving vehicle in the past, and may store the calculation result in the storage unit provided in the automatic driving device 100. Then, the selection unit 13 may select the route using the other automatically-driving vehicle ratio stored in the storage unit.

In a case where a plurality of routes or the short routes in which the other automatically-driving vehicle ratio is the highest exists, the route may be selected by a method besides the method of selecting the route or the short route in which the number of the other manually-driving vehicles is the smallest as the route for the vehicle V to travel. For example, the selection unit 13 may select a route or a short route in which there are many manually-driving buses of which the behavior is considered to be easily predicted despite that the buses are the other manually-driving vehicle, as the route for the vehicle V to travel. Alternatively, the selection unit 13 may select a route or a short route in which the number of manually-driving taxis which are driving-operated manually is small, as the route for the vehicle V to travel. That is because the manually-driving taxis are considered to take actions other than those taken by ordinary manually-driving vehicles such as stopping at intersections for passengers to get on and off, and thus it is considered that the prediction of the behavior is difficult.

The position acquisition unit 2, the route searching unit 11, the calculation unit 12, and the selection unit 13 are not limited to be mounted on the vehicle V. For example, at least any of the position acquisition unit 2, the route searching unit 11, the calculation unit 12, and the selection unit 13 may be provided on the information center or the like besides the vehicle V.

The calculation unit 12 calculates the other automatically-driving vehicle ratio, but may calculate the other manually-driving vehicle ratio. In this case, the selection unit 13 selects the route or the short route in which the other manually-driving vehicle ratio is low as the route for the vehicle V to travel.

The position acquisition unit 2 is not limited to use the position information transmitted from the other automatically-driving vehicle and the other manually-driving vehicle. For example, by causing a probe car capable of identifying the other automatically-driving vehicle and the other manually-driving vehicle to travel, the position acquisition unit 2 may acquire the position information on the other automatically-driving vehicle and the position information on the other manually-driving vehicle detected by the probe car. In addition, an image processing device identifies the other automatically-driving vehicle and the other manually-driving vehicle based on the result of imaging by a camera, and then, the identification results and the positions at which the other automatically-driving vehicle and the other manually-driving vehicle are imaged are associated with each other. Then, the position acquisition unit 2 may acquire the position information in which the identification result between the other automatically-driving vehicle and the other manually-driving vehicle identified by the image processing device and the position at which the other automatically-driving vehicle and the other manually-driving vehicle are imaged are associated with each other.

The selection unit 13 selects the route based on the other automatically-driving vehicle ratio. However, the selection of the route based on the other automatically-driving vehicle ratio and the selection of the route based on the number of the other automatically-driving vehicles may be switched. For example, in a case where the total number of the other automatically-driving vehicles on the plurality of routes searched by the route searching unit 11 is greater than a first threshold value, the selection unit 13 may select the route using the other automatically-driving vehicle ratio. In addition, in a case where the total number of the other automatically-driving vehicles on the plurality of routes searched by the route searching unit 11 is equal to or less than the first threshold value, the selection unit 13 may select the route using the number of the other automatically-driving vehicles. Furthermore, in a case where the total number of the other automatically-driving vehicles on the plurality of routes searched by the route searching unit 11 is equal to or less than a second threshold value, the selection unit 13 may select the route using a criteria (for example, a length of the route) besides the other automatically-driving vehicle ratio and the number of the other automatically-driving vehicles. Here, the value of the second threshold value is smaller than the value of the first threshold value. The situation in which the total number of the other automatically-driving vehicles on the route is equal to or less than the second threshold value means, for example, a case where the vehicle V almost does not meet the other automatically-driving vehicle during the travelling.

Second Embodiment

Figure 5:
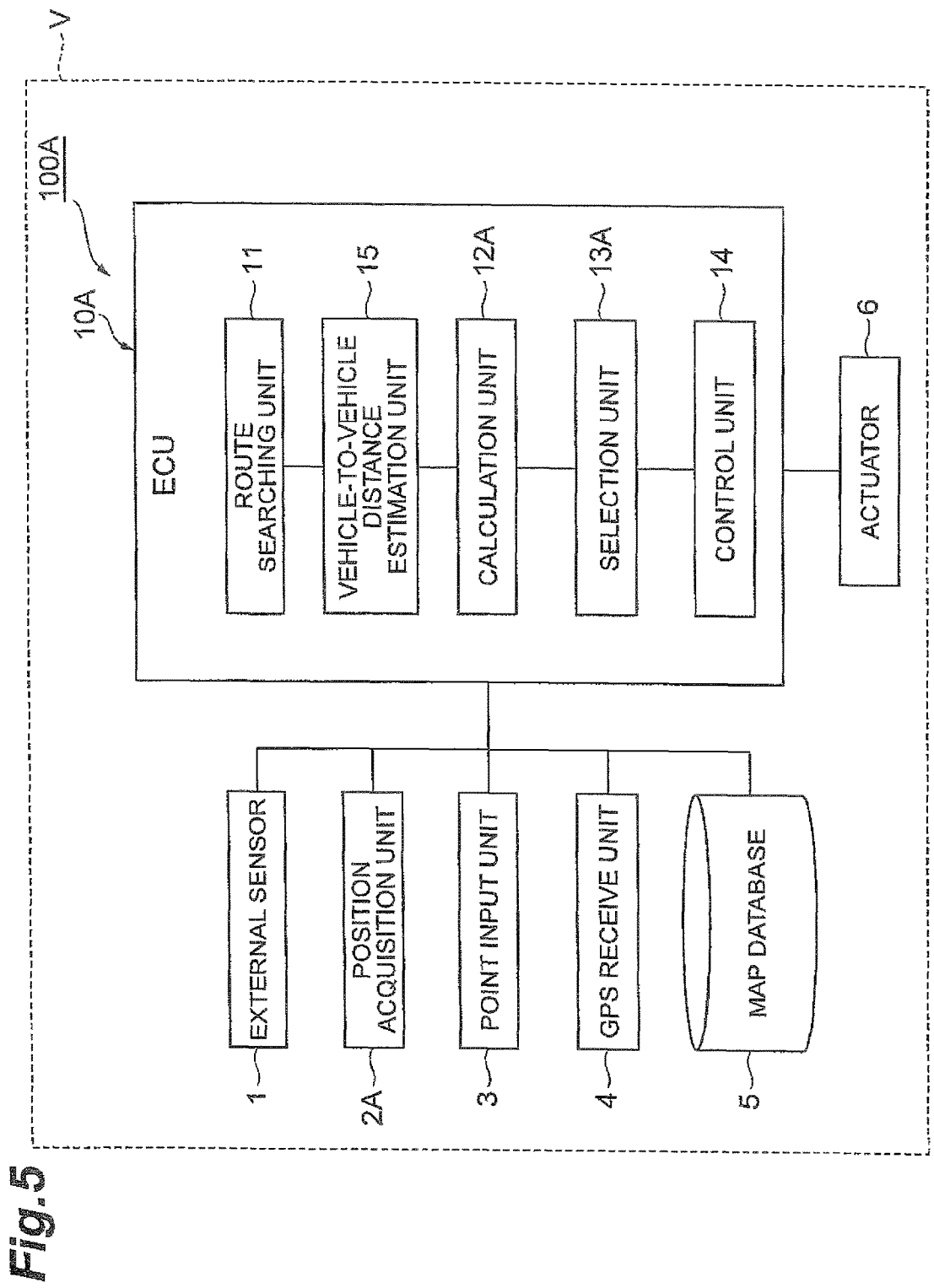
FIG. 5 is a block diagram illustrating a configuration of an automatic driving device in a second embodiment.

Next, a second embodiment will be described. As illustrated in FIG. 5, the automatic driving device 100A is mounted on the vehicle V such as an automobile. The automatic driving device 100A includes the external sensor 1, a position acquisition unit (a first position acquisition unit and a vehicle speed acquisition unit) 2A, the point input unit 3, the GPS receiving unit 4, the map database 5, the actuator 6, and an ECU 10A. Hereinafter, points other than those in the automatic driving device 100 in the first embodiment will be mainly described.

The position acquisition unit 2A performs communications with the information center installed outside of the vehicle V, and acquires position information on an the other automatically-driving vehicle and a vehicle speed of the other automatically-driving vehicle. Here, the other automatically-driving vehicle transmits a signal indicating the automatic driving, the position information, and the vehicle speed of the other automatically-driving vehicle to the information center in association with each other. More specifically, the other automatically-driving vehicle uses, for example, the current position of the other automatically-driving vehicle and the position of each point on the route set by the automatic driving device performing the automatic driving and the time of passing through each point, as the position information transmitted to the information center. In addition, the other automatically-driving vehicle uses, for example, the current vehicle speed and the predicted vehicle speed at the time when passing through the point on the route set by the automatic driving device, as the vehicle speed to be transmitted to the information center. The position of each point on the route, the vehicle speed at each point, and the time when passing through each point are associated each other in advance for each point by the automatic driving device on the other automatically-driving vehicle. The other automatically-driving vehicle associates the current position of the other automatically-driving vehicle, the current vehicle speed, and the current time with each other. The other automatically-driving vehicle transmits the signal indicating the automatic driving and the position, the vehicle speed, and the time which are in association with each other to the information center.

The information center performs the communications with a plurality of the other automatically-driving vehicles and acquires and stores the signal indicating the automatic driving and the position information and the vehicle speed of the other automatically-driving vehicle.

The position acquisition unit 2A may acquire the position information and the vehicle speed of the other automatically-driving vehicle existing within a predetermined region including the route searched by a route searching unit 11 described below. Alternatively, the position acquisition unit 2A may acquire the position information and the vehicle speed of the other automatically-driving vehicle existing within a predetermined range from the searched route based on the route searched by a route searching unit 11. The position acquisition unit 2A may perform the communications with the information center via the communication line such as the Internet.

The position acquisition unit 2A is not limited to acquiring the position information and the vehicle speed of the other automatically-driving vehicle from the information center. For example, the position acquisition unit 2A may perform vehicle-to-vehicle communications with the other automatically-driving vehicle, and then, may acquire the position information and the vehicle speed from the other automatically-driving vehicle.

The ECU 10A controls the automatic driving of the vehicle V. The ECU 10A is an electronic control unit including a CPU, a ROM, a RAM, and the like. The ECU 10A includes the route searching unit 11, a vehicle-to-vehicle distance estimation unit 15, a calculation unit 12A, a selection unit 13A, and the control unit 14.

The vehicle-to-vehicle distance estimation unit 15 estimates the vehicle-to-vehicle distance on the route on which the other automatically-driving vehicle travels for each route searched by the route searching unit 11, based on the vehicle speed acquired by the position acquisition unit 2A. Hereinafter, the process of estimating the vehicle-to-vehicle distance by the estimation unit 15 when a plurality of routes are searched by the route searching unit 11 will be described in two cases where the via-point does not exist and where the via-point exists.

[The Case where the Via-Point does not Exist]

The process of estimating the vehicle-to-vehicle distance by the vehicle-to-vehicle distance estimation unit 15 in a case where the plurality of routes are searched by the route searching unit 11 and the via-point does not exist on the searched route, will be described with the case illustrated in FIG. 2A as an example.

The vehicle-to-vehicle distance estimation unit 15 acquires the vehicle speeds of the other automatically-driving vehicle travelling on the first route A and the second route B in which the vehicle-to-vehicle distance are subject to be estimated, from the position acquisition unit 2A. More specifically, the vehicle-to-vehicle distance estimation unit 15 acquires the current vehicle speeds of the other automatically-driving vehicle travelling on the first route A and the second route B respectively. The vehicle-to-vehicle distance estimation unit 15 can determine whether or not the other automatically-driving vehicle is travelling on the first route A and the second route B at the current time based on the position associated with the current time among the position information on the other automatically-driving vehicle acquired by the position acquisition unit 2A.

When acquiring the vehicle speed, the vehicle-to-vehicle distance estimation unit 15 is not limited to using the vehicle speed associated with the current time, and may use the vehicle speed associated with the time within a predetermined range from the current time. In addition, the vehicle-to-vehicle distance estimation unit 15 may use the vehicle speed associated with the time closest to the current time.

In a case where a plurality of the other automatically-driving vehicles travels on the route in which the vehicle-to-vehicle distance are subject to be estimated, the vehicle-to-vehicle distance estimation unit 15 may use an average value of the vehicle speeds. Alternatively, the vehicle-to-vehicle distance estimation unit 15 may use the vehicle speed of the other automatically-driving vehicle selected based on a predetermined condition among the vehicle speeds of the plurality of the other automatically-driving vehicles.

Here, the vehicle speed of the other automatically-driving vehicle is assumed to be V [km/h]. The vehicle-to-vehicle distance D [m] is, for example, expressed as following Equation (1). A function f (V) is a function determined in advance $$D[m]=f(V) \qquad (1)$$

The vehicle-to-vehicle distance estimation unit 15 estimates each vehicle-to-vehicle distance for the first route A and the second route B using the acquired vehicle speeds of the other automatically-driving vehicle and above-described Equation (1).

[The Case where the Via-Point Exists]

The process of estimating the vehicle-to-vehicle distance by the vehicle-to-vehicle distance estimation unit 15 in a case where the plurality of routes are searched by the route searching unit 11 and the via-point P3 exists on the searched route, will be described with the case illustrated in FIG. 2B as an example. First, the vehicle-to-vehicle distance estimation unit 15 divides the first route A and the second route B searched by the route searching unit 11 into two routes at the via-point P3 respectively as similar to the calculation unit 12 in the first embodiment.

Next, the vehicle-to-vehicle distance estimation unit 15 estimates the vehicle-to-vehicle distance on the short route a1 and the short route b1. Specifically, first, the vehicle-to-vehicle distance estimation unit 15 acquires the vehicle speeds of the other automatically-driving vehicle travelling on the short route a1 and the short route b1 from the position acquisition unit 2A. More specifically, the vehicle-to-vehicle distance estimation unit 15 acquires the current vehicle speeds of the other automatically-driving vehicle travelling on the short route a1 and the short route b1. The vehicle-to-vehicle distance estimation unit 15 can determine whether or not the other automatically-driving vehicle is travelling on the short route a1 and the short route b1 at the current time based on the position associated with the current time among the position information on the other automatically-driving vehicle acquired by the position acquisition unit 2A.

When acquiring the vehicle speed, the vehicle-to-vehicle distance estimation unit 15 is not limited to using the vehicle speed associated with the current time, and may use the vehicle speed associated with the time within a predetermined range from the current time. In addition, the vehicle-to-vehicle distance estimation unit 15 may use the vehicle speed associated with the time closest to the current time.

In a case where a plurality of the other automatically-driving vehicles travels, the vehicle-to-vehicle distance estimation unit 15 may use the average value of the vehicle speeds. Alternatively, the vehicle-to-vehicle distance estimation unit 15 may use the vehicle speed of the other automatically-driving vehicle selected based on a predetermined condition among the vehicle speeds of the plurality of the other automatically-driving vehicles. The vehicle-to-vehicle distance estimation unit 15 estimates each vehicle-to-vehicle distance for the short route a1 and the short route b1 using the acquired vehicle speeds of the other automatically-driving vehicle and above-described Equation (1).

Next, the vehicle-to-vehicle distance estimation unit 15 estimates the vehicle-to-vehicle distance on the short route a2 and the short route b2. Specifically, first, the vehicle-to-vehicle distance estimation unit 15 estimates the time at which the vehicle V passes through the via-point P3. As an example, the time may be a time at which the vehicle V passes through the via-point P3 in a case of travelling on the short route selected by the selection unit 13A among the short route a1 and the short route b1. Alternatively, the time may be a time calculated based on at least any of the time at which the vehicle V passes through the via-point P3 in a case of travelling on the short route a1 and the time at which the vehicle V passes through the via-point P3 in a case of travelling on the short route b1. The vehicle-to-vehicle distance estimation unit 15 estimates the time at which the vehicle V passes through the via-point P3 by performing the processing similar to that by the calculation unit 12 in the first embodiment.

The vehicle-to-vehicle distance estimation unit 15 acquires the vehicle speeds of the other automatically-driving vehicle travelling on the short route a2 and the short route b2 from the position acquisition unit 2A. More specifically, the vehicle-to-vehicle distance estimation unit 15 acquires the vehicle speeds of the other automatically-driving vehicle travelling on the short route a2 and the short route b2 at the time at which the vehicle V is estimated to pass through the via-point P3. The vehicle-to-vehicle distance estimation unit 15 can determine whether or not the other automatically-driving vehicle is travelling on the short route a2 and the short route b2 at the time at which the vehicle V is estimated to pass through the via-point P3 based on the position associated with the time at which the vehicle V is estimated to pass through the via-point P3 among the position information on the other automatically-driving vehicle acquired by the position acquisition unit 2A.

When acquiring the vehicle speed, the vehicle-to-vehicle distance estimation unit 15 is not limited to using the vehicle speed associated with the time at which the vehicle V is estimated to pass through the via-point P3, and may use the vehicle speed associated with the time within a predetermined range from the estimated time. In addition, the vehicle-to-vehicle distance estimation unit 15 may use the vehicle speed associated with the time closest to the estimated time.

Similar to the case of estimating the vehicle-to-vehicle distance on the short route a1 and the short route b1, the vehicle-to-vehicle distance estimation unit 15 estimates each vehicle-to-vehicle distance for the short route a2 and the short route b2 using the acquired vehicle speeds of the other automatically-driving vehicle and above-described Equation (1).

The calculation unit 12A calculates the total number of all other vehicles on the route for each route based on the distance for route searched by the route searching unit 11 from the first point to the second point and the vehicle-to-vehicle distance estimated by the estimation unit 15. Then, the calculation unit 12A calculates the other automatically-driving vehicle ratio for each route based on the calculated total number and the position information on the other automatically-driving vehicle. Hereinafter, when the plurality of routes is searched by the route searching unit 11, the process of calculating the other automatically-driving vehicle ratio by the calculation unit 12A will be described in two cases where the via-point does not exist and where the via-point exists.

[The Case where the Via-Point does not Exist]

The process of estimating the other automatically-driving vehicle ratio by the calculation unit 12A in a case where the plurality of routes are searched by the route searching unit 11 and the via-point does not exist on the searched route, will be described with the case illustrated in FIG. 2A as an example.

The calculation unit 12A acquires lengths of the first route A and the second route B from the route searching unit 11. Information relating to the distance of the route is also included in the map information prepared in the map database 5. The route searching unit 11 calculates the distance of the route or the short route based on the information relating to the distance of the route included in the map information.

The length of the route which is a calculation target of the total number of the other vehicles is assumed to be T [m] and the vehicle-to-vehicle distance at the time is assumed to be $D=f(V)$. The total number of all other vehicles on the route which is a calculation target of the total number of all other vehicles is expressed as following Equation (2).

$$\text{Total number} = T/D \qquad (2)$$

The calculation unit 12A can calculate the total number of all other vehicles on the first route A based on the acquired length of the first route A, the vehicle-to-vehicle distance on the first route A estimated by the vehicle-to-vehicle distance estimation unit 15, and the above-described Equation (2). Similarly, the calculation unit 12A can calculate the total number of all other vehicles on the second route B based on the acquired length of the second route B, the vehicle-to-vehicle distance on the second route B estimated by the vehicle-to-vehicle distance estimation unit 15, and the above-described Equation (2).

In addition, the number of the other automatically-driving vehicles on the route which is the calculation target of the number of the other vehicles is assumed to be a. In this case, the other automatically-driving vehicle ratio on the route which is the calculation target of the number of the other vehicles is expressed as following Equation (3).

$$\text{Ratio} = a \times D/T \qquad (3)$$

The calculation unit 12A calculates the ratio of the other automatically-driving vehicle to the all other vehicles on the first route A based on the number of the other automatically-driving vehicles on the first route A, the total number of all other each vehicles (T/D) on the first route A calculated by Equation (2), and the above-described Equation (3). Similarly, the calculation unit 12A calculates the ratio of the other automatically-driving vehicle to the all other vehicles on the second route B based on the number of the other automatically-driving vehicles on the second route B, the total number of all other vehicles (T/D) on the second route B calculated by Equation (2), and the above-described Equation (3).

Here, the calculation unit 12A calculates the number of all other automatically-driving vehicles on the first route A and the number of all other automatically-driving vehicles on the second route B based on the position information on the other automatically-driving vehicle acquired by the position acquisition unit 2A. When calculating the number of the other automatically-driving vehicles on the first route A or the second route B, the calculation unit 12A determines whether or not the other automatically-driving vehicle exists on the first route A or the second route B based on the position associated with the current time among the position information on the other automatically-driving vehicle. The calculation unit 12A calculates the number of the other automatically-driving vehicles on the first route A or the second route B based on the determination result.

When calculating the number of the other automatically-driving vehicles, the calculation unit 12A is not limited to using the position associated with the current time, and may use the position associated with the time within a predetermined range from the current time. In addition, the calculation unit 12A may use the position associated with the time closest to the current time, among the position information for each of the other automatically-driving vehicles.

[The Case where the Via-Point Exists]

The process of calculating the other automatically-driving vehicle ratio by the calculation unit 12A in a case where the plurality of routes are searched by the route searching unit 11 and the via-point exists on the searched route, will be described with the case illustrated in FIG. 2B as an example. First, as similar to the processing performed by the calculation unit 12 in the first embodiment, the vehicle-to-vehicle distance estimation unit 15 divides the first route A and the second route B searched by the route searching unit 11 into two routes at the via-point P3 respectively.

The calculation unit 12A acquires the length of the short route a1 and the short route b1 from the route searching unit 11. The calculation unit 12A calculates the total number of all other vehicles on the short route a1 based on the acquired length of the short route a1, the vehicle-to-vehicle distance on the short route a1 estimated by the vehicle-to-vehicle distance estimation unit 15, and the above-described Equation (2). Similarly, the calculation unit 12A calculates the total number of all other vehicles on short route b1 based on the acquired length of the short route b1, the vehicle-to-vehicle distance on the short route b1 estimated by the vehicle-to-vehicle distance estimation unit 15, and the above-described Equation (2).

The calculation unit 12A calculates the ratio of the other automatically-driving vehicle to the all other vehicles on the short route a1 based on the number of the other automatically-driving vehicles on the short route a1, the total number of all other vehicles (T/D) on the short route a1 calculated by Equation (2), and the above-described Equation (3). Similarly, the calculation unit 12A calculates the ratio of the other automatically-driving vehicle to the all other vehicles on the short route b1 based on the number of the other automatically-driving vehicles on the short route b1, the total number of all other vehicles (T/D) on the short route b1 calculated by Equation (2), and the above-described Equation (3).

Here, the calculation unit 12A calculates the number of all other automatically-driving vehicles on the short route a1 and the number of all other automatically-driving vehicles on the short route b1 based on the position information on the other automatically-driving vehicle acquired by the position acquisition unit 2A. When calculating the number of the other automatically-driving vehicles on the short route a1 or the short route b1, the calculation unit 12A determines whether or not the other automatically-driving vehicle exists on the short route a1 or the short route b1 based on the position associated with the current time among the position information on the other automatically-driving vehicle. The calculation unit 12A calculates the number of the other automatically-driving vehicles on the short route a1 or the short route b1 based on the determination result.

When calculating the number of the other automatically-driving vehicles, the calculation unit 12A is not limited to using the position associated with the current time, and may use the position associated with the time within a predetermined range from the current time. In addition, the calculation unit 12A may use the position associated with the time closest to the current time, among the position information for each of the other automatically-driving vehicles.

Next, the calculation unit 12A calculates the ratio of the number of the other automatically-driving vehicles to the total number of all other vehicles on the short route a2, and the ratio of the number of the other automatically-driving vehicles to the total number of all other vehicles on the short route b2. Specifically, first, the calculation unit 12A acquires the length of the short route a2 and the short route b2 from the route searching unit 11.

The calculation unit 12A calculates the total number of all other vehicles on the short route a2 based on the acquired length of the short route a2, vehicle-to-vehicle distance on the short route a2 estimated by the vehicle-to-vehicle distance estimation unit 15, and the above-described Equation (2). Similarly, the calculation unit 12A calculates the total number of all other vehicles on the short route b2 based on the acquired length of the short route b2, vehicle-to-vehicle distance on the short route b2 estimated by the vehicle-to-vehicle distance estimation unit 15, and the above-described Equation (2).

The calculation unit 12 estimates the time at which the vehicle V passes through the via-point P3. As an example, the above-described time may be a time of passing the via-point P3 in a case where the vehicle V travels on the short route selected by the selection unit 13 among the short route a1 and the short route b1. Alternatively, the above-described time may be a time calculated based on at least any of the time of passing through the via-point P3 in a case of traveling the short route a1 or the time of passing through the via-point P3 in a case of traveling the short route b1.

The calculation unit 12A calculates the number of all other automatically-driving vehicles on the short route a2 and the number of all other automatically-driving vehicles on the short route b2 based on the position information on the other automatically-driving vehicle acquired by the position acquisition unit 2A. When calculating the number of the other automatically-driving vehicles on the short route a2 or the short route b2, the calculation unit 12A determines whether or not the other automatically-driving vehicle exists on the short route a2 or the short route b2 based on the position associated with the time at which the vehicle V is estimated to pass through the via-point P3 among the position information on the other automatically-driving vehicle. Based on the determination result, the calculation unit 12A calculates the number of the other automatically-driving vehicles on the short route a2 or the short route b2.

When calculating the number of the other automatically-driving vehicles, the calculation unit 12A is not limited to using the position associated with the time at which the vehicle V is estimated to pass through the via-point P3, and may use the position associated with the time within a predetermined range from the estimated time. In addition, the calculation unit 12A may use the position associated with the time closest to the estimated time, among the position information for each of the other automatically-driving vehicles.

The calculation unit 12A calculates the ratio of the other automatically-driving vehicle to the number of all other vehicles on the short route a2 based on the calculated number of the other automatically-driving vehicles on the short route a2, the total number of all other vehicles (T/D) on the short route a2 calculated by Equation (2), and the above-described Equation (3). Similarly, the calculation unit 12A calculates the ratio of the other automatically-driving vehicle to the all other vehicles on the short route b2 based on the calculated number of the other automatically-driving vehicles on the short route b2, the total number of all other vehicles (T/D) on the short route b2 calculated by Equation (2), and the above-described Equation (3).

In a case where a plurality of routes is searched by the route searching unit 11, as similar to the selection unit 13 in the first embodiment, the selection unit 13A selects the route in which the other automatically-driving vehicle ratio calculated calculation unit 12A is the highest or the short route in which the other automatically-driving vehicle ratio is the highest as the route for the vehicle V to travel.

Next, processing tasks executed in the automatic driving device 100A will be described in detail with reference to a flowchart in FIG. 6. The processing tasks described below are executed after the first point and the second point are received by the point input unit 3.

Figure 6:
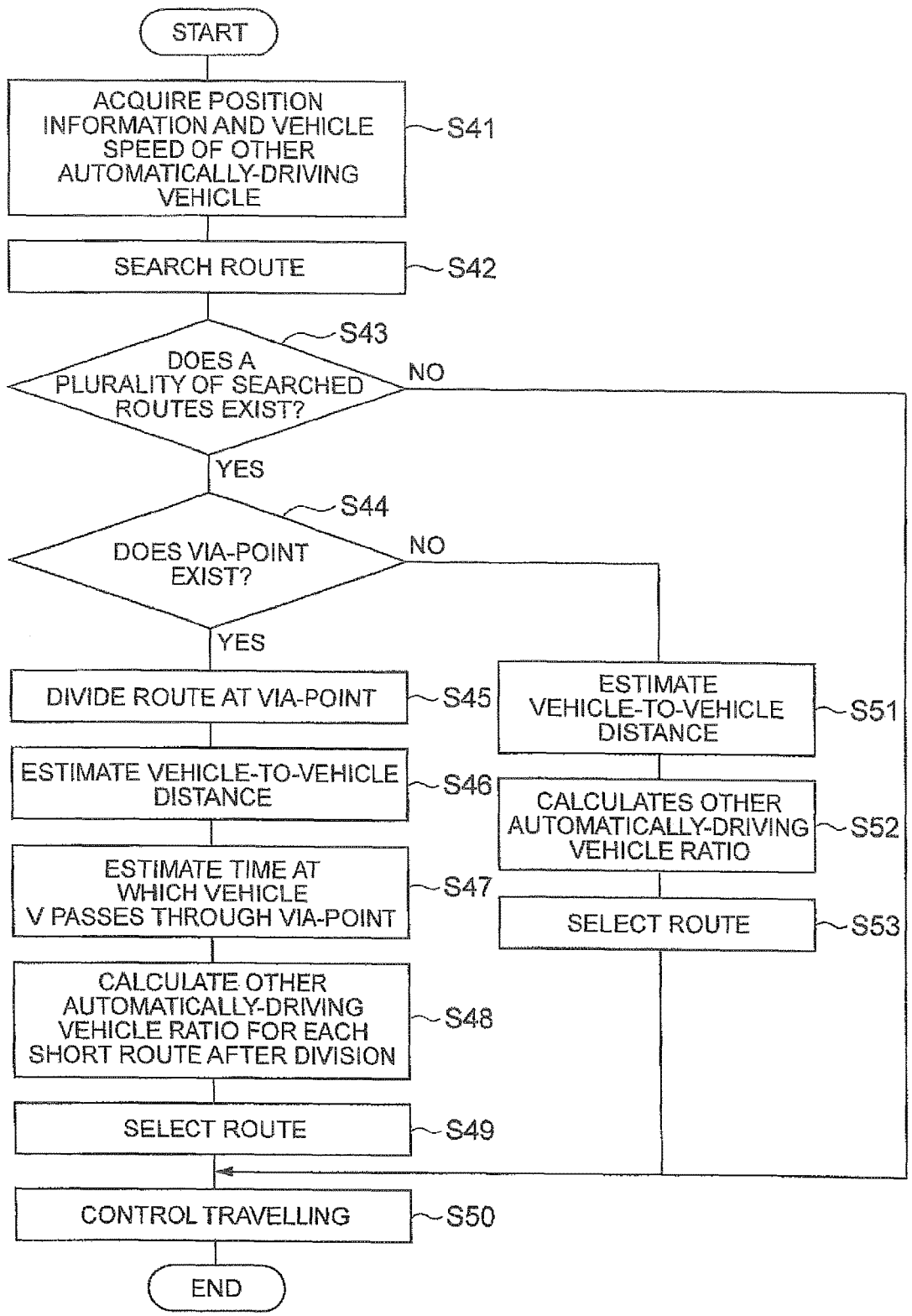
FIG. 6 is a flowchart illustrating a flow of processing performed in the automatic driving device.

As illustrated in FIG. 6, the position acquisition unit 2A performs communications with the information center and acquires the position information and the vehicle speed of the other automatically-driving vehicle (S41). The processing tasks from S42 to S45 are the same as the processing tasks from S3 to S6 described in the first embodiment using FIG. 3, and the description thereof will not be repeated. After the processing in S45, the vehicle-to-vehicle distance estimation unit 15 estimates the vehicle-to-vehicle distance on the short route for each short route (S46). The calculation unit 12A estimates the time at which the vehicle V passes through the via-point (S47). The calculation unit 12A calculates the ratio of the other automatically-driving vehicle to the all other vehicles on the short route for each short route (S48). The selection unit 13A selects the short route in which the other automatically-driving vehicle ratio is the highest among the plurality of short routes toward the second point as the route for the vehicle V to travel. The processing in S50 is the same as the processing in S10 described in the first embodiment using FIG. 3, and the description thereof will not be repeated.

In S44 described above, in a case where it is determined that the via-point does not exist (NO in S44), the vehicle-to-vehicle distance is estimated for each route searched by the route searching unit 11 (S51). The calculation unit 12A calculates the ratio of the other automatically-driving vehicles to the all other vehicles on the route for each searched route (S52). The selection unit 13A selects the route in which the other automatically-driving vehicle ratio is the highest among the plurality of routes toward the second point as the route for the vehicle V to travel.

As described above, in a case where a plurality of routes is searched, the automatic driving device 100A in the present embodiment selects the route in which the other automatically-driving vehicle ratio is the highest. Here, the control unit 14 performs the calculation for predicting the behavior of the other vehicle around the host vehicle at the time of travelling on the selected route, and performs the automatic driving of the host vehicle based on the prediction result. In the other automatically-driving vehicle, it is possible to decrease the range of predicting the behavior of the vehicle compared to the other vehicle besides the automatically-driving the other vehicle. For this reason, in the route in which the other automatically-driving vehicle ratio is high, it is possible to decrease the amount of calculation relating to the automatic driving. Therefore, according to the automatic driving device 100A, in a case where a plurality of routes is searched, since the route in which the other automatically-driving vehicle ratio is the highest is selected, it is possible to select the route in which the amount of calculation relating to the automatic driving is small. In addition, the automatic driving device 100A can calculate the total number of all other vehicles on the route using the position information on the other automatically-driving vehicle without using the position information on the other manually-driving vehicle.

In a case where the via-point exists on the searched route, the calculation unit 12A calculates the other automatically-driving vehicle ratio on the short route in which the via-point is the start point based on the time at which the vehicle V passes through the via-point. In this way, the automatic driving device 100A can calculate the other automatically-driving vehicle ratio with high accuracy while considering the time at which the vehicle V reaches the via-point.

A second exemplary embodiment is described as above. However, the exemplary embodiments are not limited thereto. For example, the automatic driving device 100A may not select the route considering the via-point. Specifically, the automatic driving device 100A may not execute the processing tasks illustrated in S44 to S49 in FIG. 6. That is, in a case where a plurality of routes is searched in S43 (YES in S43), the calculation unit 12A executes the processing of S51.

When calculating the other automatically-driving vehicle ratio, the calculation unit 12A may calculate the ratio based on the position associated with a predetermined time in the past among the position information on the other automatically-driving vehicle. In addition, as examples, the calculation unit 12A may calculate the other automatically-driving vehicle ratio for each day or for each time period, the other automatically-driving vehicle ratio on the weekdays and the holidays, or the ratio in a case where there is an event in the surrounding area and a case where there is no event in advance based on the position information on the other automatically-driving vehicle in the past, and may store the calculation result in the storage unit provided in the automatic driving device 100A. Then, the selection unit 13A may select the route using the other automatically-driving vehicle ratio stored in the storage unit.

In a case where a plurality of routes or the short routes in which the other automatically-driving vehicle ratio is the highest exist, for example, the selection unit 13A may select a route or a short route in which there are many manually-driving buses as the route for the vehicle V to travel. Alternatively, the selection unit 13A may select a route or a short route in which the number of manually-driving taxis is small, as the route for the vehicle V to travel.

The position acquisition unit 2A, the route searching unit 11, the calculation unit 12A, the selection unit 13A, and the vehicle-to-vehicle distance estimation unit 15 are not limited to be mounted on the vehicle V. For example, at least any of the position acquisition unit 2A, the route searching unit 11, the calculation unit 12A, the selection unit 13A, and the vehicle-to-vehicle distance estimation unit 15 may be provided on the information center or the like besides the vehicle V.

The calculation unit 12A calculates the other automatically-driving vehicle ratio, but may calculate the other manually-driving vehicle ratio. In this case, the selection unit 13A selects the route or the short route in which the other manually-driving vehicle ratio is low as the route for the vehicle V to travel.

The position acquisition unit 2A is not limited to use the position information transmitted from the other automatically-driving vehicle. For example, by causing a probe car capable of identifying the other automatically-driving vehicle to travel, the position acquisition unit 2A may acquire the position information on the other automatically-driving vehicle detected by the probe car. In addition, an image processing device identifies the other automatically-driving vehicle and the other manually-driving vehicle based on the result of imaging by a camera, and then, the identification results and the positions at which the other automatically-driving vehicle are imaged are associated with each other. Then, position acquisition unit 2A may acquire the position information in which the identification result between the other automatically-driving vehicle identified by the image processing device and the position at which the other automatically-driving vehicle is imaged are associated with each other.

The selection unit 13A selects the route based on the other automatically-driving vehicle ratio. However, the selection of the route based on the other automatically-driving vehicle ratio and the selection of the route based on the number of the other automatically-driving vehicles may be switched based on the number of the other automatically-driving vehicles. For example, in a case where the total number of the other automatically-driving vehicles on the plurality of routes searched by the route searching unit 11 is greater than a first threshold value, the selection unit 13A may select the route using the other automatically-driving vehicle ratio. In addition, in a case where the total number of the other automatically-driving vehicles on the plurality of routes searched by the route searching unit 11 is equal to or less than the first threshold value, the selection unit 13A may select the route using the number of the other automatically-driving vehicles. Furthermore, in a case where the total number of the other automatically-driving vehicles on the plurality of routes searched by the route searching unit 11 is equal to or less than a second threshold value, the selection unit 13A may select the route using a criteria (for example, a length of the route) besides the other automatically-driving vehicle ratio.

Third Embodiment

Figure 7:
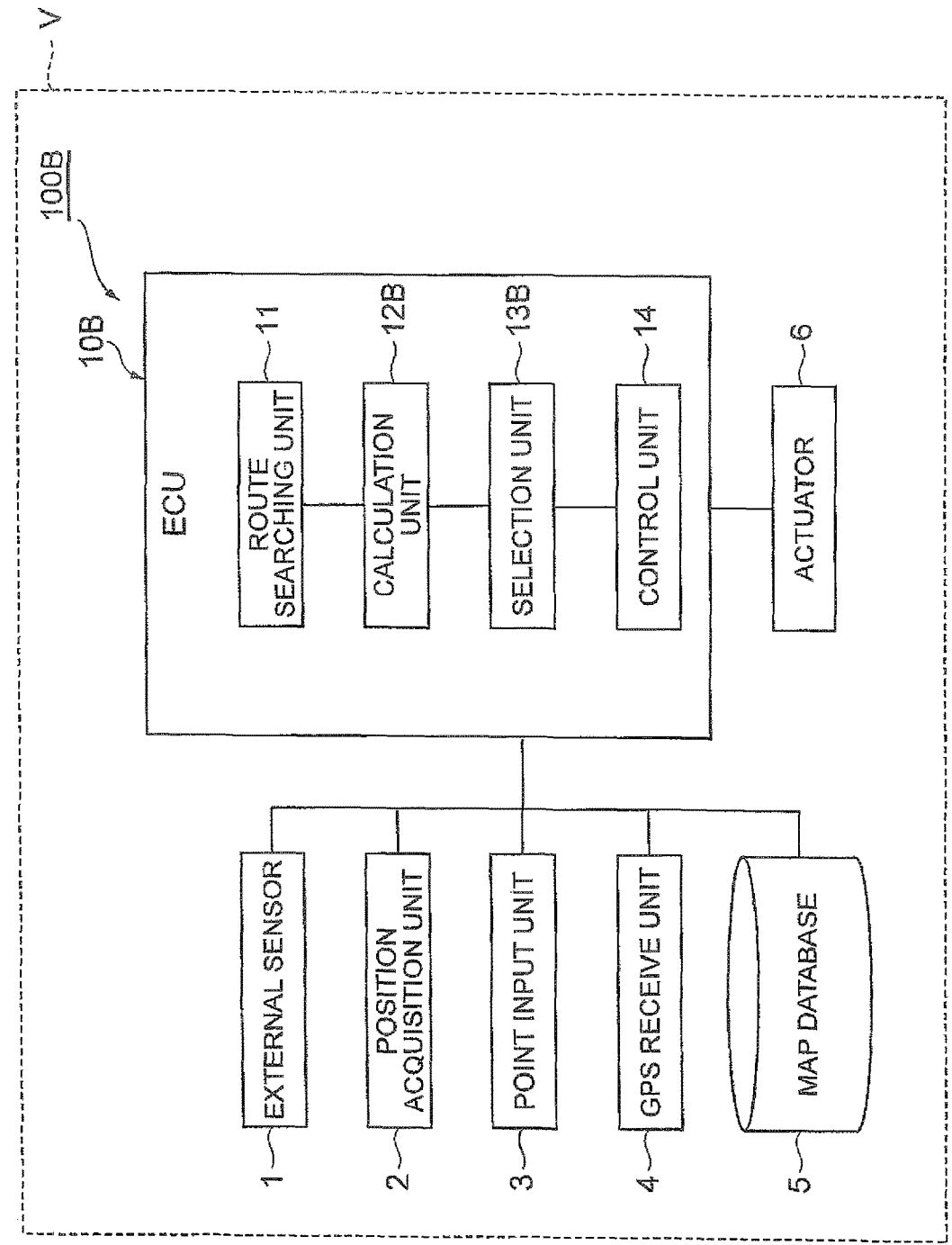
FIG. 7 is a block diagram illustrating a configuration of an automatic driving device in a third embodiment.

Next, a third embodiment will be described. As illustrated in FIG. 7, the automatic driving device 100B is mounted on the vehicle V such as an automobile. The automatic driving device 100B includes the external sensor 1, the position acquisition unit (a first position acquisition unit and a second position acquisition unit) 2, the point input unit 3, the GPS receiving unit 4, the map database 5, the actuator 6, and an ECU 10B. Hereinafter, points other than those in the automatic driving device 100 in the first embodiment will be mainly described.

The ECU 10B controls the automatic driving of the vehicle V. The ECU 10B is an electronic control unit including the CPU, the ROM, the RAM, and the like. The ECU 10B includes the route searching unit 11, a calculation unit 12B, a selection unit 13B and the control unit 14.

In a case where a plurality of routes is selected by the route searching unit 11, the calculation unit 12B calculates the number of the other automatically-driving vehicles for each route based on the position information on the other automatically-driving vehicle acquired by the position acquisition unit 2. Hereinafter, when the plurality of routes is searched by the route searching unit 11, the process of calculating the number of the other automatically-driving vehicles by the calculation unit 12B will be described in two cases where the via-point does not exist and where the via-point exists.

[The Case where the Via-Point does not Exist]

The process of calculating the number of the other automatically-driving vehicles by the calculation unit 12B in a case where the plurality of routes are searched by the route searching unit 11 and the via-point does not exist on the searched route, will be described with the case illustrated in FIG. 2A as an example.

First, as similar to the calculation unit 12 in the first embodiment, the calculation unit 12B calculates the number of all other automatically-driving vehicles on the first route A and the number of all other automatically-driving vehicles on the second route B based on the position information on the other automatically-driving vehicle acquired by the position acquisition unit 2. In addition, as similar to the calculation unit 12 in the first embodiment, the calculation unit 12B calculates the number of all other manually-driving vehicles on the first route A and the number of all other manually-driving vehicles on the second route B based on the position information on the other manually-driving vehicle acquired by the position acquisition unit 2.

[The Case where the Via-Point Exists]

The process of calculating the number of the other automatically-driving vehicles by the calculation unit 12B in a case where the plurality of routes are searched by the route searching unit 11 and the via-point P3 exists on the searched route, will be described with the case illustrated in FIG. 2B as an example.

First, as similar to the calculation unit 12 in the first embodiment, the calculation unit 12B divides the first route A and the second route B searched by the route searching unit 11 into two routes at the via-point P3 respectively. Next, the calculation unit 12B, as similar to the calculation unit 12 in the first embodiment, calculates the number of all other automatically-driving vehicles on the short route a1 and the number of all other automatically-driving vehicles on the short route b1 based on the position information on the other automatically-driving vehicle acquired by the position acquisition unit 2. In addition, the calculation unit 12B, as similar to the calculation unit 12 in the first embodiment, calculates the number of all other manually-driving vehicles on the short route a1 and the number of all other manually-driving vehicles on the short route b1 based on the position information on the other manually-driving vehicle acquired by the position acquisition unit 2.

Next, as similar to the calculation unit 12 in the first embodiment, the calculation unit 12B calculates the number of all other automatically-driving vehicles on the short route a2 and the number of all other automatically-driving vehicles on the short route b2 based on the position information on the other automatically-driving vehicle acquired by the position acquisition unit 2. In addition, as similar to the calculation unit 12 in the first embodiment, the calculation unit 12B calculates the number of all other manually-driving vehicles on the short route a2 and the number of all other manually-driving vehicles on the short route b2 based on the position information on the other manually-driving vehicle acquired by the position acquisition unit 2.

In a case where a plurality of routes is searched by the route searching unit 11, the selection unit 13B selects the route in which the calculated number is greater as the route for the vehicle V to travel based on the number of the other automatically-driving vehicles calculated by the calculation unit 12B. Hereinafter, when the plurality of routes is searched by the route searching unit 11, the process of selecting the route by the selection unit 13B will be described in two cases where the via-point does not exist and where the via-point exists.

[The Case where the Via-Point does not Exist]

The process of selecting the route by the selection unit 13B in a case where the plurality of routes are searched by the route searching unit 11 and the via-point does not exist on the searched route, will be described with the case illustrated in FIG. 2A as an example. The selection unit 13B selects the route in which the number of the other automatically-driving vehicles is greater among the first route A and the second route B as the route for vehicle V to travel based on the number of all other automatically-driving vehicles on the first route A and the number of all other automatically-driving vehicles on the second route B calculated by the calculation unit 12B.

[The Case where the Via-Point Exists]

The process of calculating the other automatically-driving vehicle ratio by the selection unit 13B in a case where the plurality of routes are searched by the route searching unit 11 and the via-point P3 exists on the searched route, will be described with the case illustrated in FIG. 2B as an example.

First, the selection unit 13B selects the route from the first point P1 to the via-point P3. Specifically, the selection unit 13B selects the route in which the number of the other automatically-driving vehicles is higher among the short route a1 and the short route b1 as the route for vehicle V to travel based on the number of all other automatically-driving vehicles on the short route a1 and the number of all other automatically-driving vehicles on the short route b1 calculated by the calculation unit 12B.

Next, the selection unit 13B selects the route from the via-point P3 to the second point P2. Specifically, the selection unit 13B selects the route in which the number of the other automatically-driving vehicles is greater among the short route a2 and the short route b2 as the route for vehicle V to travel based on the number of all other automatically-driving vehicles on the short route a2 and the number of all other automatically-driving vehicles on the short route b2 calculated by the calculation unit 12B.

In a case where a plurality of routes or the short routes in which the number of the other automatically-driving vehicles is greatest exists, the selection unit 13B may select the route in which the number of the other manually-driving vehicles is the smallest among the plurality of routes or the short routes in which the number of the other automatically-driving vehicles is the highest as the route for the vehicle V to travel. In this case, the selection unit 13B uses the number of the other manually-driving vehicles for each short route calculated by the calculation unit 12B as the number of the other manually-driving vehicles.

Next, the processing tasks executed in the automatic driving device 100B will be described in detail with reference to a flowchart in FIG. 8. The processing tasks described below are performed after the first point and the second point are received by the point input unit 3.

Figure 8:
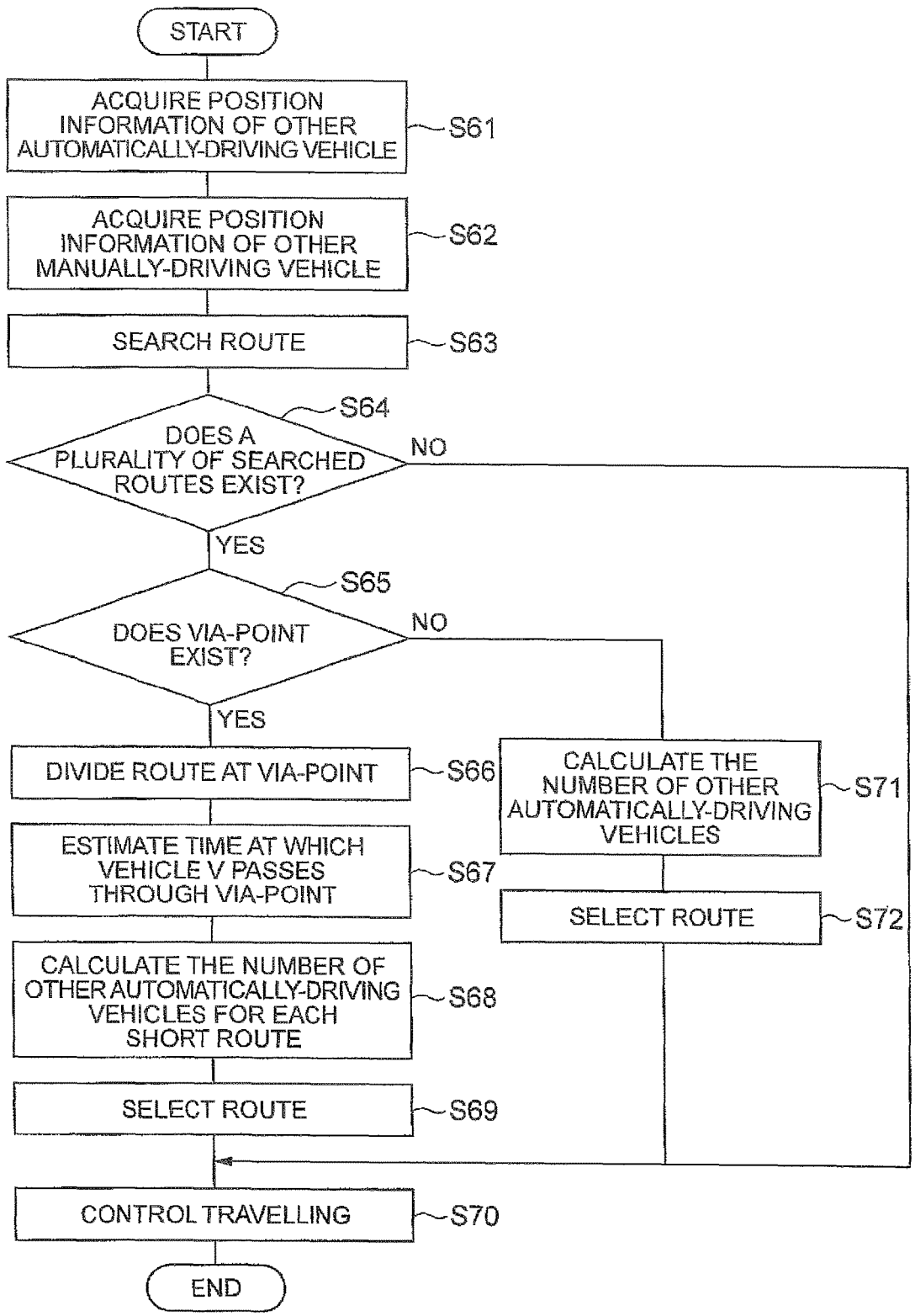
FIG. 8 is a flowchart illustrating a flow of processing performed in the automatic driving device.

The processing tasks from S61 to S67 illustrated in FIG. 8 are the same as the processing tasks from S1 to S7 described in the first embodiment using FIG. 3, and the description thereof will not be repeated. After the processing in S67, the calculation unit 12B calculates the number of the other automatically-driving vehicles for each short route after division (S68). The selection unit 13B selects the route for the vehicle V to travel among the plurality of short routes toward the second point in each point of the first point and the via-point (S69). Here, the details of selecting the route by the selection unit 13B will be described using the flowchart illustrated in FIG. 9A. As illustrated in FIG. 9A, the selection unit 13B determines whether or not a plurality of short routes in which the number of the other automatically-driving vehicles is the greatest exists among the plurality of short routes toward the second point in each point of the first point and the via-point (S81). In a case where the plurality of short routes in which the number of the other automatically-driving vehicles is the greatest exists (YES in S81), the selection unit 13B selects the short route in which the number of the other manually-driving vehicles is the smallest as the route for the vehicle V to travel (S82). In a case where the plurality of short routes in which the number of the other automatically-driving vehicles is the greatest does not exist (NO in S81), the selection unit 13B selects the short route in which the number of the other automatically-driving vehicles is the greatest as the route for the vehicle V to travel (S83). After the route is selected by the selection unit 13B, the control unit 14 performs the automatic driving such that the vehicle V travels along the route selected by the selection unit 13B (S70).

In S65 described above, in a case where the via-point does not exist (NO in S65), the calculation unit 12B calculates the number of all other automatically-driving vehicles on the route for each route searched by the route searching unit 11 (S71). The selection unit 13B selects the route for the vehicle V to travel based on the number calculated by the calculation unit 12B (S72). Here, the details of selecting the route by the selection unit 13B will be described using the flowchart illustrated in FIG. 9B. As illustrated in FIG. 9B, the selection unit 13B determines whether or not a plurality of routes in which the number of the other automatically-driving vehicles is the greatest exists among the plurality of routes from the first point to the second point (S91). In a case where the plurality of routes in which the number of the other automatically-driving vehicles is the greatest exists (YES in S91), the selection unit 13B selects the route in which the number of the other manually-driving vehicles is the smallest as the route for the vehicle V to travel (S92). In a case where the plurality of routes in which the number of the other automatically-driving vehicles is the greatest does not exist (NO in S91), the selection unit 13B selects the route in which the number of the other automatically-driving vehicles is the greatest as the route for the vehicle V to travel (S93). After the route is selected by the selection unit 13B, the control unit 14 performs the automatic driving such that the vehicle V travels along the route selected by the selection unit 13B (S70).

As described above, in a case where a plurality of routes is searched, the automatic driving device 100B in the present embodiment selects the route in which the number of the other automatically-driving vehicles is the greatest. Here, the automatic driving device 100B performs the calculation for predicting the behavior of the other vehicle around the vehicle V at the time of travelling on the selected route, and performs the automatic driving of the vehicle V based on the prediction result. In the other automatically-driving vehicle, it is possible to decrease the range of predicting the behavior of the vehicle compared to the other manually-driving vehicle. For this reason, in the route in which the number of the other automatically-driving vehicles is great, it is possible to decrease the amount of calculation relating to the automatic driving. Therefore, according to the automatic driving device 100B, in a case where a plurality of routes is searched, since the route in which the number of the other automatically-driving vehicles is the greatest is selected, it is possible to select the route in which the amount of calculation relating to the automatic driving is small.

In a case where a plurality of routes in which the number of the other automatically-driving vehicles is the greatest exists, the selection unit 13B selects the route in which the number of the other manually-driving vehicles is the smallest as the route for the vehicle V to travel. In this way, even in a case where a plurality of routes in which the number of the other automatically-driving vehicles is the greatest exists, since the automatic driving device 100B selects the route in which the number of the other manually-driving vehicles is the smallest, it is possible to select the route in which the amount of calculation relating to the automatic driving is small.

In a case where a plurality of via-points exists on the searched route, the calculation unit 12B calculates the number of the other automatically-driving vehicles on the short route in which the via-point is the start point based on the time at which the vehicle V passes through the via-point. In this way, the automatic driving device 100B can calculate the number of the other automatically-driving vehicles with high accuracy while considering the time at which the vehicle V reaches the via-point.

A third exemplary embodiment is described as above. However, the exemplary embodiments are not limited thereto. For example, the automatic driving device 100B may not select the route considering the via-point. Specifically, the automatic driving device 100B may not execute the processing tasks in S65 to S69 illustrated in FIG. 8. That is, in a case where a plurality of routes is searched by the route searching unit 11 (YES in S64), the calculation unit 12B executes the processing in S71.

When calculating the number of the other automatically-driving vehicles, the calculation unit 12B may calculate the number based on the position associated with a predetermined time in the past among the position information on the other automatically-driving vehicle. In addition, as examples, the calculation unit 12B may calculate the number of the other automatically-driving vehicles for each day or for each time period, the number of the other automatically-driving vehicles on the weekdays and the holidays, or the number of the other automatically-driving vehicles in a case where there is an event in the surrounding area or a case where there is no event in advance based on the position information on the other automatically-driving vehicle in the past, and may store the calculation result in the storage unit provided in the automatic driving device 100B. Then, the selection unit 13B may select the route using the number of the other automatically-driving vehicles stored in the storage unit.

In a case where a plurality of routes or short routes in which the number of the other automatically-driving vehicles is the greatest exist, the route may be selected by a method besides the method of selecting the route or the short route in which the number of the other manually-driving vehicles is the smallest as the route for the vehicle V to travel. For example, the selection unit 13B may select a route or a short route in which there are many manually-driving buses as the route for the vehicle V to travel. Alternatively, the selection unit 13B may select a route or a short route in which the number of manually-driving taxis is small, as the route for the vehicle V to travel. As described above, in a case where the route selection is performed using the value besides the number of the other manually-driving vehicles, the position acquisition unit 2 may not acquire the position information on the other manually-driving vehicle and the calculation unit 12B may not calculate the number of the other manually-driving vehicles.

The position acquisition unit 2, the route searching unit 11, the calculation unit 12B, and the selection unit 13B are not limited to be mounted on the vehicle V. For example, at least any of the position acquisition unit 2, the route searching unit 11, the calculation unit 12B, and the selection unit 13B may be provided on the information center or the like besides the vehicle V.

The calculation unit 12B calculates the number of the other automatically-driving vehicles, but may calculate the number of the other manually-driving vehicles. In this case, the selection unit 13B selects the route or the short route in which the number of the other manually-driving vehicles is small as the route for the vehicle V to travel.

In addition, after the route for the vehicle V to travel is selected, the automatic driving devices 100, 100A, and 100B in the first to third embodiments may select a route again at a point in the middle of the route on which the vehicle V travels from the first point toward the second point. In this case, the automatic driving devices 100, 100A, and 100B perform the above-described process of selecting a route with the point in the middle of the route on which the vehicle V travels from the first point toward the second point as the first point.

In a case where a plurality of routes is searched by the route searching unit 11, the automatic driving devices 100, 100A, and 100B may display the route in which the other automatically-driving vehicle ratio is the highest and the other route on the display unit so as to be identified from each other.

What is claimed is:

1. A device configured to select a route from a first point to a second point and perform an automatic driving of a host vehicle so as to travel along the selected route, the device comprising:
a first position acquisition unit configured to acquire position information on other automatically-driving vehicles that perform automatic driving;
a route searching unit configured to determine a plurality of routes from the first point to the second point based on map information;
a vehicle speed acquisition unit configured to acquire a vehicle speed of each of the other automatically-driving vehicles on which the position information is acquired by the first position acquisition unit;
a vehicle-to-vehicle distance estimation unit configured to estimate a vehicle-to-vehicle distance on each of the plurality of routes based on the vehicle speed acquired by the vehicle speed acquisition unit;
a calculation unit configured to calculate a total number of all other vehicles, which is the total number of all vehicles other than the host vehicle, on each of the plurality of routes based on the distance for each route from the first point to the second point acquired by the map information and the vehicle-to-vehicle distance for each route estimated by the vehicle-to-vehicle distance estimation unit, and calculate a ratio of the number of the other automatically-driving vehicles to the total number of all other vehicles for each of the plurality of routes;
a selection unit configured to select a route from among the plurality of routes in which the other automatically-driving vehicle ratio calculated by the calculation unit is the highest as a route for the host vehicle to travel; and
a control unit configured to control the host vehicle such that the host vehicle travels along the route selected by the selection unit.

2. The device of claim 1, wherein the first position acquisition unit is configured to acquire the position information on all other automatically-driving vehicles within a predetermined range from each of the plurality of routes determined by the route searching unit.

3. The device of claim 1, wherein the vehicles besides the other automatically-driving vehicles that do not perform automatic driving are manually-driving vehicles.

4. The device of claim 3, wherein the total number of all other vehicles on the route for each one of the plurality of routes is the sum of all other automatically-driving vehicles and all of the manually-driving vehicles on each route.

* * * * *